(12) United States Patent
Takahashi et al.

(10) Patent No.: US 11,608,876 B2
(45) Date of Patent: Mar. 21, 2023

(54) SPEED REDUCER AND DRIVE DEVICE

(71) Applicant: NABTESCO CORPORATION, Tokyo (JP)

(72) Inventors: Masahiro Takahashi, Tokyo (JP); Yuto Nakai, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/412,656

(22) Filed: Aug. 26, 2021

(65) Prior Publication Data

US 2022/0065329 A1 Mar. 3, 2022

(30) Foreign Application Priority Data

Aug. 31, 2020 (JP) .............................. JP2020-146280

(51) Int. Cl.
*F16H 1/32* (2006.01)
*F16H 57/04* (2010.01)
*F16H 57/021* (2012.01)

(52) U.S. Cl.
CPC .............. *F16H 1/32* (2013.01); *F16H 57/021* (2013.01); *F16H 57/0412* (2013.01); *F16H 2001/325* (2013.01)

(58) Field of Classification Search
CPC ...... F16H 1/32; F16H 57/021; F16H 57/0412; F16H 2001/325; F16H 2001/323; B62D 5/0403; B62D 5/0418; B62D 5/0421; B62D 5/0427

See application file for complete search history.

(56) References Cited

U.S. PATENT DOCUMENTS

| | | | | |
|---|---|---|---|---|
| 5,161,290 A * | 11/1992 | Hashimoto | ............... | B23Q 5/10 74/819 |
| 5,895,590 A * | 4/1999 | Suzuki | ................ | F16H 57/0412 219/205 |
| 6,981,478 B2 * | 1/2006 | Schafer | ................... | H02K 7/116 123/90.31 |
| 7,476,174 B2 * | 1/2009 | Fujimoto | .................. | F16H 1/32 475/180 |
| 7,811,193 B2 * | 10/2010 | Nakamura | ................ | F16H 1/46 475/179 |

(Continued)

FOREIGN PATENT DOCUMENTS

| | | | | |
|---|---|---|---|---|
| CN | 201714953 U | * | 1/2011 | |
| CN | 104864036 A | * | 8/2015 | ............... F16H 1/32 |

(Continued)

OTHER PUBLICATIONS

Office Action dated Sep. 8, 2022 issued in corresponding German Patent Application No. 10 2021 122 243.5 with English translation (11 pgs.).

(Continued)

*Primary Examiner* — Sherry L Estremsky
(74) *Attorney, Agent, or Firm* — Pillsbury Winthrop Shaw Pittman, LLP

(57) ABSTRACT

A speed reducer according to the present invention includes: at least one gear member for changing a speed of rotations input from a rotary device and outputting the rotations; a case housing the gear member; and a heating unit provided on the case and configured to heat the case or an inside of the case.

11 Claims, 23 Drawing Sheets

(56) References Cited

U.S. PATENT DOCUMENTS

| | | | |
|---|---|---|---|
| 9,719,578 B2 * | 8/2017 | Okimura | F16H 1/32 |
| 10,486,734 B2 * | 11/2019 | Nakamura | B62D 5/0415 |
| 10,724,604 B2 * | 7/2020 | Hayashibara | B25J 9/046 |
| 2010/0113206 A1 * | 5/2010 | Wang | F16H 1/32 475/180 |
| 2011/0012314 A1 * | 1/2011 | Nakamura | F16J 15/008 277/562 |
| 2014/0290922 A1 | 10/2014 | Palanchon | |
| 2016/0002268 A1 | 1/2016 | Ohshima et al. | |
| 2019/0162281 A1 * | 5/2019 | Nakamura | F16H 37/041 |
| 2021/0129901 A1 * | 5/2021 | Brown | B62D 7/20 |

FOREIGN PATENT DOCUMENTS

| | | | | |
|---|---|---|---|---|
| CN | 204553795 U | * | 8/2015 | |
| CN | 106931081 A | * | 7/2017 | |
| DE | 19741536 A1 | * | 4/1998 | B60L 11/18 |
| DE | 102007035010 A1 | * | 1/2009 | B60K 7/0007 |
| DE | 20 2008 018 128 U1 | | 1/2012 | |
| DE | 102011120748 A1 | | 6/2013 | |
| DE | 112014001647 T5 | | 12/2015 | |
| DE | 11 2014 001 645 T5 | | 1/2016 | |
| JP | 2006144888 A | * | 6/2006 | |
| JP | 2007145059 A | * | 6/2007 | |
| JP | 2016-109264 A | | 6/2016 | |
| JP | 2017128302 A | * | 7/2017 | B62D 5/0421 |
| KR | 950004924 Y1 | * | 6/1995 | |

OTHER PUBLICATIONS

Office Action dated Feb. 2, 2023, issued in corresponding German Patent Application No. DE 102021122243.5 with English translation (10 pgs.).

* cited by examiner

SPEED REDUCER AND DRIVE DEVICE

CROSS-REFERENCE TO RELATED APPLICATIONS

This application is based on and claims the benefit of priority from Japanese Patent Application Serial No. 2020-146280 (filed on Aug. 31, 2020), the contents of which are hereby incorporated by reference in their entirety.

TECHNICAL FIELD

The present invention relates to a speed reducer and a drive device.

BACKGROUND

Japanese Patent Application Publication No. 2016-109264 discloses a speed reducer including an external gear, an internal gear that internally meshes with the external gear, a casing having the internal gear disposed thereon, and a carrier that rotates relative to the casing.

Speed reducers may be used for various equipment. However, in order to apply speed reducers to various equipment, the various equipment to which the speed reducers are mounted need to be formed to have space that can contain the speed reducers.

SUMMARY

The present invention provides a speed reducer and a drive device that can be applied to various equipment and have a small size.

A speed reducer according to an aspect of the present invention comprises: at least one gear member for changing a speed of rotations input from a rotary device and outputting the rotations; a case housing the at least one gear member; and a heating unit provided on the case and configured to heat the case or an inside of the case.

When the speed reducer is used outdoors, the air temperature often falls below zero depending on the regions where it is used. In such an environment, when the speed reducer is actuated, solidification occurs within the speed reducer, particularly in the lubricant, making it difficult to accomplish satisfactory performance of the speed reducer. For example, the speed reducer may be unable to operate. For example, when the speed reducer is installed in a steering device of a vehicle, the conventional way to avoid the solidification of the lubricant was to use the heat from the engine. However, vehicles are recently being electrified (motor-driven). For electrified vehicles, it is difficult to raise the temperature of the lubricant by the heat from the engine.

To address this problem, in the speed reducer according to the aspect, the heating unit is provided in (built in) the case of the speed reducer. With this configuration, the heating unit provided in the case raises the temperature of the lubricant in the case to reduce the viscosity of the lubricant, even in a cold region, for example. This ensures actuation of the speed reducer even when the speed reducer is installed on a vehicle of cold region specifications, for example. Further, since the heating unit is installed using the case of the speed reducer, there is no need of separately providing a dedicated mounting member for installing the heating unit, making it possible to downsize the speed reducer. The speed reducer can thus be mounted on various equipment, resulting in a wide range of application of the speed reducer.

A speed reducer according to another aspect of the present invention comprises: at least one gear member for changing a speed of rotations input from a rotary device and outputting the rotations; a case housing the at least one gear member; and a sleeve provided on the case and configured to protect a seal tightly sealing the case.

When the speed reducer is used in a specific environment such as outdoors and particularly vehicles, the speed reducer is used more frequently in environments having external factors such as rain, high pressure cleaning, ultraviolet rays, and hitting stones that previously had no impact. Therefore, currently no speed reducers can be used outdoors securely. Although sleeves are generally used for cleaning robots for example, these sleeves are not shaped for preventing impacts of external factors such as rain, high pressure cleaning, ultraviolet rays, and hitting stones.

To address this problem, the sleeve is used to block the gap of the case properly. Therefore, an oil seal can be covered satisfactorily (securely) by the sleeve. Thus, with the use of the sleeve, the oil seal can be protected from the impacts of the external factors such as rain, high pressure cleaning, ultraviolet rays, and hitting stones. In addition, the sleeve is provided on the case. This arrangement does not need a dedicated component for mounting the sleeve and thus downsizes the speed reducer.

In the above configuration, it is also possible that the case has internal teeth, and the at least one gear member includes: a crankshaft supported so as to be rotatable around a rotation axis that corresponds to an axial direction of the case; and a plurality of external tooth members each having external teeth meshing with the internal teeth, the plurality of external tooth members being eccentrically movable by the crankshaft.

A speed reducer according to another aspect of the present invention comprises: a case having internal teeth; a crankshaft disposed radially inside the case and supported so as to be rotatable around a rotation axis that corresponds to an axial direction of the case; and a plurality of external tooth members each having external teeth meshing with the internal teeth, the plurality of external tooth members being eccentrically movable by the crankshaft, wherein the case has 80 to 120 internal teeth, and wherein an amount of eccentricity of the crankshaft is 1.3 mm or smaller.

The requirements for the speed reducer installed in the steering device include a light weight, a small size, and a high load capacity. The steering device is operated by a driver with assistance of a rotary device such as a motor. Therefore, steering is required to be performed with no discomfort in the feel or sensation on the steering wheel. Further, the speed reducer contains the mechanism configured to oscillate eccentrically, and this mechanism needs to perform the eccentric oscillation smoothly.

To address these requirements, the number of internal teeth is within the range of 80 to 120. Since the number of internal teeth is withing this range, a larger number of internal teeth are provided than in conventional speed reducers. This increases the number of internal teeth that receive loads from the external tooth members. As a result, the speed reducer withstands a high load, while it remains in a small size. Also, the amount of eccentricity of the crankshaft is 1.3 mm or smaller. Since the amount of eccentricity of the crankshaft is reduced, it is possible to reduce the amount of vibration of the crankshaft and the external tooth members. This eliminates discomfort to the driver, and enables the speed reducer to rotate smoothly.

A drive device according to another aspect of the present invention comprises: a rotary device; and a speed reducer including: at least one gear member for changing a speed of rotations input from the rotary device and outputting the rotations; and a case housing the at least one gear member, wherein the rotary device is mounted to the case, and wherein a wall of the case to which the rotary device is mounted serves as a wall of a housing of the rotary device.

In a typical rotary mechanism (such as a motor), the whole of a device body (such as a motor body) is covered by a mechanism case. Therefore, at the portion where the rotary mechanism is mounted to the speed reducer, the case of the speed reducer and the case of the rotary device overlap with each other. Further, for example, screw holes need to be formed in the case of the speed reducer in order to mount the case of the rotary device to the case of the speed reducer with bolts or the like. The case of the speed reducer thus has a large wall thickness.

The drive shaft of the rotary device extends through the case of the rotary device and the case of the speed reducer into the speed reducer. Therefore, the drive shaft of the rotary device may possibly be long, leading to a high inertia. This may possibly cause a large load on the rotary device. Further, since the case of the speed reducer and the case of the rotary device overlap with each other, it is difficult to make the drive device flat (i.e., small).

To address these problems, the case portion which is a portion of the case of the speed reducer that faces the rotary device is also used as a portion of the case of the rotary device. Therefore, only the case portion is interposed between the speed reducer and the rotary device. This arrangement makes it possible to reduce the length of the drive shaft of the rotary device and thus reduce the inertia, leading to a reduced load on the rotary device. In addition, the drive device can be made flat (i.e., small).

In the above configuration, it is also possible that the case has internal teeth, the at least one gear member includes: a crankshaft supported so as to be rotatable around a rotation axis that corresponds to an axial direction of the case; and a plurality of external tooth members each having external teeth meshing with the internal teeth, the plurality of external tooth members being eccentrically movable by the crankshaft, and the rotary device inputs a rotational force to the crankshaft.

A drive device according to another aspect of the present invention comprises: a rotary device; a speed reducer including at least one gear member, the at least one gear member being configured to change a speed of rotations input from the rotary device and to output the rotations; and an operation mechanism for inputting an external rotational force to the at least one gear member, wherein the operation mechanism includes a sensing unit for sensing a rotation angle and a torque when the rotational force is input to the at least one gear member.

There is a demand that a steering device of a vehicle include sensors for performing automatic steering and assist control for automatic driving and electrification. Therefore, sensors (such as a sensing unit for sensing rotation angles and torques) that can be installed in equipment spaces within existing vehicles are required. Further, because of the structure of the existing vehicles, for example, the crankshaft (rotational shaft) of the speed reducer is disposed orthogonal to an operation shaft connected to the steering wheel. Therefore, for example, a bevel gear is provided on the operation shaft of the operation mechanism, and the sensing unit is provided on the operation shaft.

With this configuration, the sensors (such as the sensing unit for sensing rotational angles and torques) necessary for the automatic steering and assist control can be installed in small spaces within the existing vehicles, and input through orthogonal shafts is possible from the operation shaft connected to the steering wheel. Specifically, the rotary device is controlled based on the rotational angle and the torque sensed by the sensing unit, such that the rotary device can actuate the speed reducer. In this way, the sensing unit and the rotary device can assist the operation of the driver.

In the above configuration, it is also possible that the speed reducer includes a case having internal teeth, the at least one gear member includes: a crankshaft supported so as to be rotatable around a rotation axis that corresponds to an axial direction of the case; and a plurality of external tooth members each having external teeth meshing with the internal teeth, the plurality of external tooth members being eccentrically movable by the crankshaft, and the rotary device and the operation mechanism each input a rotational force to the crankshaft.

A speed reducer according to another aspect of the present invention comprises: a case having internal teeth; a crankshaft disposed radially inside the case and supported so as to be rotatable around a rotation axis that corresponds to an axial direction of the case; a plurality of external tooth members each having external teeth meshing with the internal teeth, the plurality of external tooth members being eccentrically movable by the crankshaft; and an operation mechanism for inputting an external rotational force to the crankshaft, wherein the operation mechanism includes: a driven bevel gear for transmitting the rotational force to the crankshaft; and a driving bevel gear positioned orthogonal to an axis of the driven bevel gear and meshed with the driven bevel gear, and wherein the driven bevel gear is switchable between a first meshing position and a second meshing position for rotating different directions.

Steering devices are designed differently for a right-hand steering wheel and a left-hand steering wheel depending on the types of the vehicles and the countries where the vehicles are used. Therefore, the steering devices are redesigned for the difference between a right-hand steering wheel and a left-hand steering wheel. To be designed for both a right-hand steering wheel and a left-hand steering wheel, the steering devices are modified in the layout for installation of the operation mechanism on the vehicles or the screwing direction of built-in ball screws for steering.

With this configuration, the rotational direction of the driven bevel gear relative to the rotation of the driving bevel gear can be reversed by only switching the driven bevel gear between the first meshing position and the second meshing position. This arrangement makes it possible to change the rotation of the driven bevel gear without any modification in design of the components, except for the change in the mounting position of the driven bevel gear. Also, the operation mechanism can be downsized, and thus the drive device with the speed reducer can be downsized.

A speed reducer according to another aspect of the present invention comprises: a case having internal teeth; a crankshaft disposed radially inside the case and supported so as to be rotatable around a rotation axis that corresponds to an axial direction of the case; a plurality of external tooth members each having external teeth meshing with the internal teeth, the plurality of external tooth members being eccentrically movable by the crankshaft; a rotary device for inputting a rotational force to the crankshaft; and an operation mechanism for inputting an external rotational force to the crankshaft, wherein the crankshaft has: a first transmission gear for receiving input from the rotary device; and a second transmission gear for receiving input from the operation mechanism, the second transmission gear being disposed adjacent to the first transmission gear.

In conventional arrangement in which the crankshaft of the speed reducer receives rotational forces from two systems, the rotary device and the operation mechanism, a transmission gear for input of the rotational force from the rotary device is provided at one end of the crankshaft, and a transmission gear for input of the rotational force from the operation mechanism is provided at the other end of the crankshaft. Therefore, the crankshaft is elongated in the axial direction. In addition, the rotary device and the operation mechanism are positioned vertically opposite to each other. Therefore, the drive device with the speed reducer has a large size as a unit. In particular, when the drive device with the speed reducer is applied to a steering device, the rotary device (motor) may be positioned on the road surface side, and there is a high risk of damage due to hitting stones and muddy water from the road surface.

To address this problem, the first transmission gear and the second transmission gear are disposed adjacent to each other at the end of the crankshaft. With this arrangement, the crankshaft (i.e., the speed reducer) can receive the rotational forces from the two systems, the rotary device and the operation mechanism, while keeping the small size of the drive device with the speed reducer. In addition, the rotary device can be positioned in the upper portion and thus prevented from being affected by hitting stones or the like.

A drive device according to another aspect of the present invention comprises: a rotary device; a speed reducer having a first input shaft through which a rotational force of the rotary device is input; and an operation mechanism having a second input shaft intersecting the first input shaft, the operation mechanism being configured to input an external rotational force to the first input shaft through the second input shaft, wherein the rotary device is disposed opposite to the speed reducer and the operation mechanism relative to a plane. The plane mentioned above may be any plane selected.

For a conventional rotary device (motor) and drive device, an oil seal is provided on a drive shaft portion of the rotary device to prevent the lubricant in the speed reducer from entering the rotary device. Since the drive shaft of a rotary device is driven at a high speed, the oil seal provided thereon need to have some degree of radial load. Therefore, a large load is imparted on the drive shaft, leading to an excess loss. In addition, a typical drive device has structure in which the operation mechanism is positioned above the speed reducer. Therefore, for example, it may be difficult to maintain a sufficient spatial volume in the speed reducer, while lubricating the meshing portions in the speed reducer.

To address this problem, the rotary device is positioned on one side of any plane selected, and the speed reducer and the operation mechanism are positioned on the other side of the plane. In this arrangement, when the rotary device is positioned above the speed reducer, for example, the oil seal provided on the drive shaft portion of the rotary device can be removed. This reduces the load imparted on the drive shaft and makes it possible to reduce the excess loss (that is, to accomplish a higher efficiency and a reduced back drive torque). Also, it can be prevented by the gravity that the lubricant on the speed reducer side flows into the drive shaft portion of the rotary device.

Further, when the operation mechanism (housing case) is positioned lateral to the speed reducer, the surface of the lubricant in the speed reducer can be lower than the position of the rotary device. Also, the drive device as a whole can have sufficient space. This makes it possible to even the surface of the lubricant in the drive device, so as to maintain a sufficient spatial volume while lubricating the meshing components.

In the above configuration, it is also possible that the speed reducer includes: a case having internal teeth; a crankshaft disposed radially inside the case and supported so as to be rotatable around a rotation axis that corresponds to an axial direction of the case, the crankshaft having a transmission gear disposed on one end side of the crankshaft; and a plurality of external tooth members each having external teeth meshing with the internal teeth, the plurality of external tooth members being eccentrically movable by the crankshaft, the rotary device is disposed opposite to the speed reducer relative to the transmission gear, the rotational force of the rotary device is input to the transmission gear, and the operation mechanism inputs the external rotational force to the transmission gear through the second input shaft.

A drive device according to another aspect of the present invention comprises: a case having internal teeth; a crankshaft disposed radially inside the case and supported so as to be rotatable around a rotation axis that corresponds to an axial direction of the case; a plurality of external tooth members each having external teeth meshing with the internal teeth, the plurality of external tooth members being eccentrically movable by the crankshaft; a rotary device for inputting a rotational force to the crankshaft; and an operation mechanism for inputting an external rotational force to the crankshaft, wherein a reduction ratio of the crankshaft to the rotary device is within a range of 4 to 5, and wherein an increasing ratio of the crankshaft to the operation mechanism is within a range of 4 to 5.

In a steering device of a vehicle for example, when a drive device with a speed reducer is driven by a rotary device (motor), a high reduction ratio is required to minimize the power consumption of the rotary device. Further, when the driver rotates the steering wheel, the steering by the driver needs to be output immediately, and thus operation with a low reduction ratio is required. It is preferable that both the rotational output of the rotary device and the rotational output of the driver are input to a same speed reducer, and steering is accomplished by the rotational outputs input to the speed reducer. In order to configure the drive device such that both rotational outputs are input to the same speed reducer, and the drive device is capable of both the high reduction ratio and the low reduction ratio, it is necessary to set the transmission ratio from the rotary device to the speed reducer for deceleration and set the transmission ratio from the steering wheel to the speed reducer for acceleration.

Therefore, the reduction ratio of the crankshaft to the rotary device is within the range of 4 to 5, and the increasing ratio of the crankshaft to the operation mechanism is within the range of 4 to 5. With this configuration, an appropriate reduction ratio can be applied to the input from the rotary device to the crankshaft, and the power consumption can be reduced. Also, an appropriate increasing ratio can be applied to the input from the operation mechanism to the crankshaft, thereby facilitating quick performance of the driver operation. In addition, only with the setting of the reduction ratio of the crankshaft to the rotary device within the range of 4 to 5 and the setting of the increasing ratio of the crankshaft to the operation mechanism within the range of 4 to 5, the operation by the rotary device and the operation by the driver can be performed properly, and the drive device can be downsized.

A drive device according to another aspect of the present invention comprises: a speed reducer connecting a wheel driving portion provided on a wheel portion to an axle shaft;

and a rotary device for inputting a rotational force to the speed reducer, so as to oscillate the wheel driving portion horizontally to the axle shaft.

In the automotive industry for example, the shift to electric vehicles (EVs) is underway in consideration of their environmental impact. The challenge is to electrify driving and steering with a view to automated driving.

To address this challenge, the wheel driving portion is oscillated by the drive device (the speed reducer and the rotary device) horizontally to the axle shaft. This configuration allows the shift to EVs and automated driving of vehicles. Also, steering links can be omitted, allowing steer-by-wire configuration without the need for mechanical linkage. Since steering links are omitted, the drive device can be downsized. Further, since the drive device is provided for each wheel, it is possible, for example, to differentiate the number of rotations between inner and outer wheels, allowing steering with small losses.

A drive device according to another aspect of the present invention comprises: a rotary device provided on a tie rod and connected via a link with a wheel driving portion provided on a wheel portion, wherein the rotary device moves the tie rod in an axial direction, so as to oscillate the wheel driving portion horizontally to the tie rod.

In the automotive industry for example, the shift to electric vehicles (EVs) is underway in consideration of their environmental impact. The challenge is to electrify driving and steering with a view to automated driving.

To address this challenge, the wheel driving portions are oscillated by the drive device horizontally to the tie rod. This configuration allows the shift to EVs and automated driving of vehicles. Also, steering links can be omitted, allowing steer-by-wire configuration without the need for mechanical linkage. Since steering links are omitted, the drive device can be downsized.

Advantageous Effects

The present invention enables a speed reducer and a drive device to be applied to various equipment and have a small size.

DESCRIPTION OF THE EMBODIMENTS

Speed reducers and drive devices according to embodiments of the present invention will be hereinafter described with reference to the drawings.

First Embodiment

Figure 1:
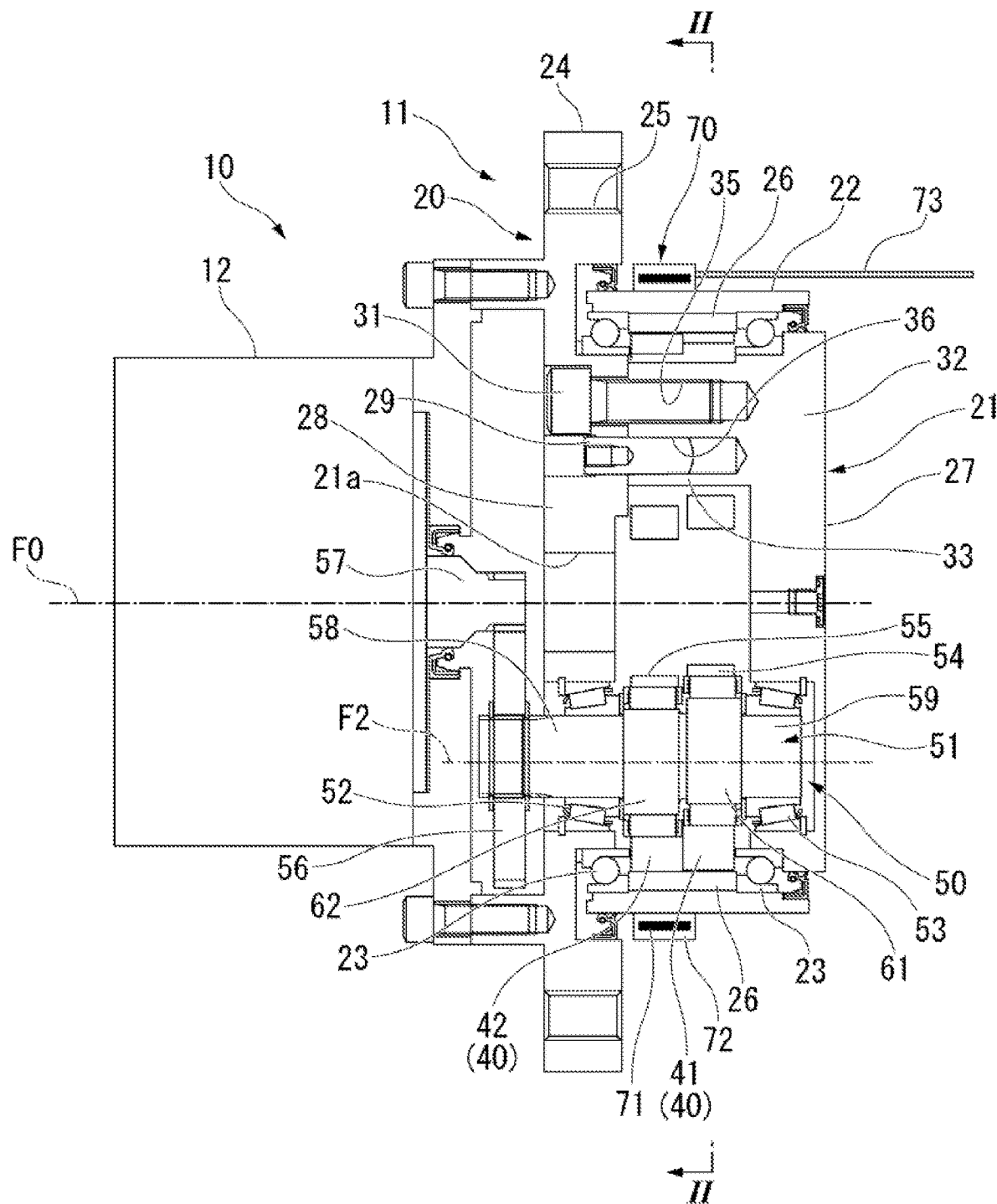
FIG. 1 is a sectional view showing a drive device according to a first embodiment of the present invention.
Figure 2:
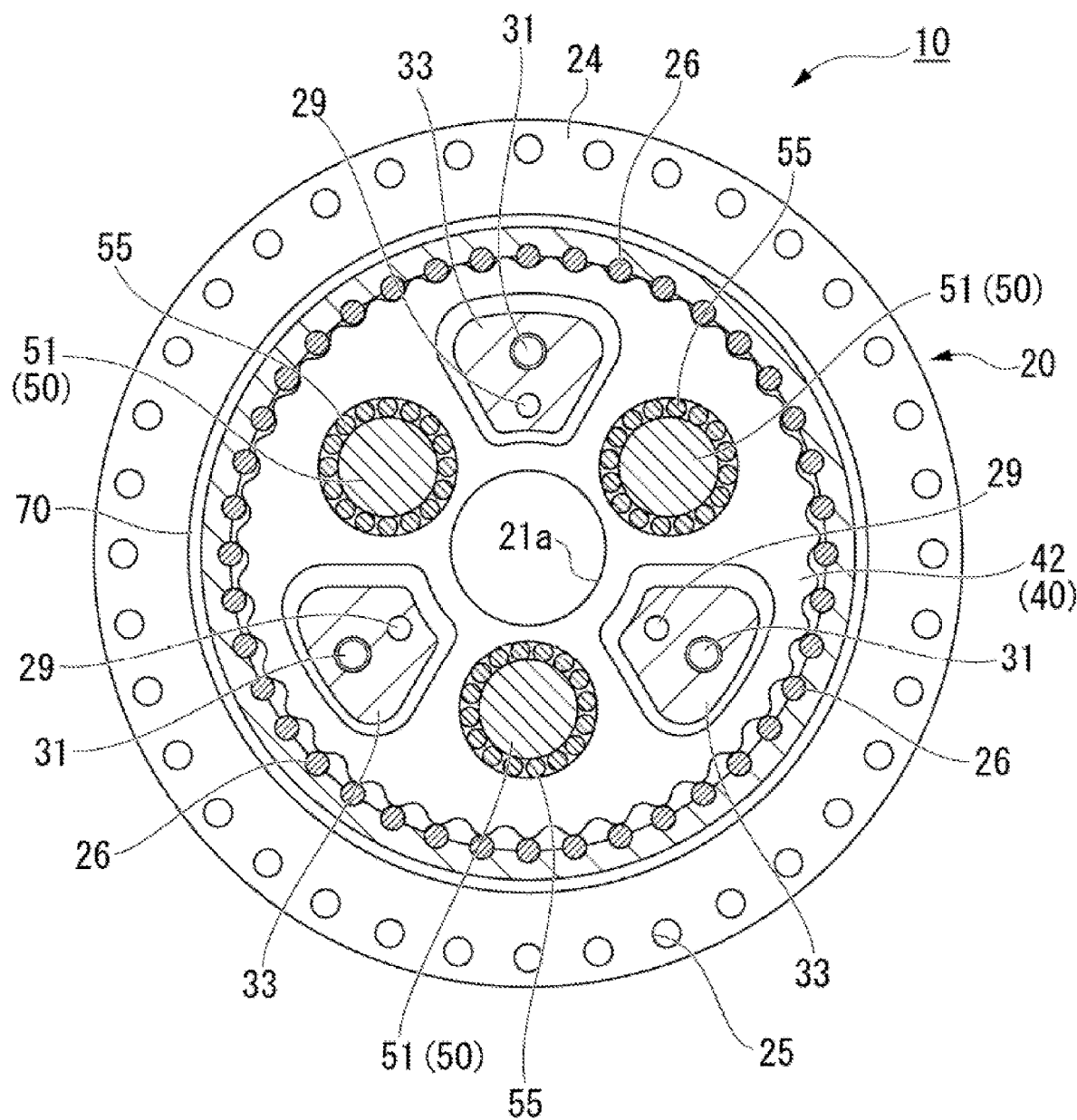
FIG. 2 is a sectional view along a line II-II in FIG. 1.

FIG. 1 is a sectional view showing a drive device according to a first embodiment. FIG. 2 is a sectional view along a line II-II in FIG. 1. As shown in FIGS. 1 and 2, the drive device 10 includes a speed reducer 11 and a rotary device 12 serving as a drive source (for example, a motor). The rotary device 12 is a drive source (for example, a motor) for driving the speed reducer 11.

The speed reducer 11 is, for example, an eccentric oscillating speed reducer used for a steering device of a vehicle such as an automobile. The speed reducer 11 includes a cylindrical housing (case) 20, a gear unit 40, three crank assemblies 50, and a heating unit 70. The cylindrical housing 20 houses therein the gear unit 40 and three crank assemblies 50. The cylindrical housing 20 includes a first case 21, a second case 22, and two main bearings 23. The two main bearings 23 allow the relative rotation of the first case 21 and the second case 22 relative to each other. Either the first case 21 or the second case 22 is an example of the output portion of the speed reducer 11.

The central axis (main axis) F0 of the speed reducer 11 is defined as the axis of rotation for the two main bearings 23. When the first case 21 is stationary, the second case 22 rotates about the main axis F0. When the second case 22 is stationary, the first case 21 rotates about the main axis F0. In other words, one of the first case 21 and the second case 22 can rotate relative to the other around the main axis F0.

An attachment flange 24 is provided on the outer circumferential surface of the first case 21 such that it surrounds the first case 21. The attachment flange 24 has a plurality of attachment holes 25 that are formed in the peripheral edge of the flange and arranged spaced apart from each other. The attachment flange 24 may be used as a spigot joint portion to mount the speed reducer 11, for example.

The second case 22 includes a plurality of internal tooth pins (internal teeth) 26 on the inner peripheral surface thereof. The internal tooth pins 26 are columnar members extending substantially parallel to the main axis F0. The internal tooth pins 26 are fitted in grooves formed in the inner wall of the second case 22. Therefore, the internal tooth pins 26 are appropriately retained by the second case 22.

The plurality of internal tooth pins 26 are arranged at regular intervals around the main axis F0. Each internal tooth pin 26 has a semicircle surface projecting from the inner wall of the second case 22 toward the main axis F0. Therefore, the plurality of internal tooth pins 26 serve as internal teeth meshing with the gear unit 40.

The first case 21 includes a base portion 27, an end plate portion 28, a positioning pin 29 and a fixing bolt 31. The first case 21 as a whole has a cylindrical shape. The first case 21 has a through hole 21a formed therein, which is centered around the main axis F0. The base portion 27 includes a base plate portion 32 and three shaft portions 33. Each of the three shaft portions 33 extends from the base plate portion 32 toward the end plate portion 28. The distal end surface of each of the three shaft portions 33 has a screw hole 35 and a reaming hole 36 formed therein. The positioning pin 29 is inserted into the reaming hole 36. This in turn accurately positions the end plate portion 28 relative to the base portion 27. The fixing bolt 31 is screwed into the screw hole 35. This in turn appropriately secures the end plate portion 28 to the base portion 27.

The gear unit 40 is disposed between the base plate portion 32 and the end plate portion 28. The three shaft portions 33 extend through the gear unit 40 and are connected to the end plate portion 28. The gear unit 40 includes two gears (external tooth members) 41, 42. The gear 41 is disposed between the base plate portion 32 and the gear 42. The gear 41 has external teeth meshing with the plurality of internal tooth pins 26. The gear 42 is disposed between the end plate portion 28 and the gear 41. The gear 42 has external teeth meshing with the plurality of internal tooth pins 26.

The gear 41 has substantially the same shape and size as the gear 42. The gears 41 and 42 perform revolution movement within the second case 22 while meshing with the internal tooth pins 26. Accordingly, the respective centers of the gears 41 and 42 revolve about the main axis F0.

The revolution of the gear 41 is out of phase with the revolution of the gear 42 by about 180°. While the gear 41 meshes with half of the internal tooth pins 26, the gear 42 meshes with the remaining half of the internal tooth pins 26. In this way, the gear unit 40 can rotate one of the first case 21 and the second case 22.

In the first embodiment, the gear unit 40 includes the two gears 41 and 42. The gear unit may alternatively include more than two gears. As another alternative example, the gear unit may include a single gear.

Each of the three crank assemblies 50 includes a crankshaft 51, four bearings 52, 53, 54 and 55 and a transmission gear 56. The three crankshafts are rotational shafts positioned at a same distance from the main axis F0 and spaced from one another in the circumferential direction. The transmission gear 56 meshes with a gear on a drive shaft 57 of the rotary device (for example, a motor) 12 serving as a drive source. The transmission gear 56 directly or indirectly receives the driving force generated by the rotary device 12 serving as a drive source. The driving force transmission path from the rotary device 12 to the transmission gear 56 can be appropriately designed depending on the service environment and the service conditions for the speed reducer 11. Accordingly, the first embodiment is not limited to any particular transmission path for the driving force from the rotary device 12 to the transmission gear 56.

FIG. 1 shows a crankshaft axis (transmission axis) F2. The transmission axis F2 is substantially parallel to the main axis F0. The three crankshaft axes F2 are positioned at a same distance from the main axis F0 and spaced from one another in the circumferential direction. The crankshaft 51 rotates about the transmission axis F2. The crankshaft 51 includes two journals (crank journals) 58, 59 and two eccentric portions (eccentric members) 61, 62. The journals 58, 59 extend along the transmission axis F2. The central axis of the journals 58, 59 coincides with the transmission axis F2. The eccentric portions 61, 62 are formed between the journals 58 and 59. Each of the eccentric portions 61 and 62 is eccentrically arranged with respect to the transmission axis F2.

The journal 58 is supported by the end plate portion 28 via the bearing 52. The journal 59 is supported by the base portion 27 via the bearing 53. The eccentric portion 61 is inserted into the bearing 54. The bearing 54 is disposed between the eccentric portion 61 and the gear 41. The eccentric portion 61 thus causes the gear 41 to move eccentrically. The eccentric portion 62 is inserted into the bearing 55. The bearing 55 is disposed between the eccentric portion 62 and the gear 42. The eccentric portion 62 thus causes the gear 42 to move eccentrically.

As a driving force is input to the transmission gear 56 from the drive shaft 57 of the rotary device 12, the crankshaft 51 rotates about the transmission axis F2. This in turn causes the eccentric portions 61, 62 to eccentrically rotate about the transmission axis F2. The gears 41, 42, which are connected to the eccentric portions 61, 62 via the bearings 54, 55, resultantly oscillate within the circular space defined by the second case 22. Since the gears 41, 42 mesh with the internal tooth pins 26, this oscillation causes relative rotation of the first case 21 and the second case 22 relative to each other.

When the speed reducer 11 is used outdoors, the air temperature often falls below zero depending on the regions where it is used. In such an environment, when the speed reducer 11 is actuated, solidification occurs within the speed reducer 11, particularly in the lubricant, making it difficult to accomplish satisfactory performance of the speed reducer 11. For example, the speed reducer 11 may be unable to operate. For example, when the speed reducer 11 is installed in a steering device of a vehicle, the conventional way to avoid the solidification of the lubricant was to use the heat from the engine. However, vehicles are recently being electrified (motor-driven). For electrified vehicles, it is difficult to raise the temperature of the lubricant by the heat from the engine.

To address this problem, for example, the heating unit 70 is provided (built in) annularly along the outer peripheral surface of the second case 22 of the cylindrical housing 20. The heating unit 70 includes a heater (hot wire) 71 and an insulator 72. The heater 71 is connected to a power source (not shown) Via a wire harness 73. The insulator 72 is formed of an insulating material such as rubber and shaped to cover the heater 71.

Since the heating unit 70 is provided along the outer peripheral surface of the second case 22, the heating unit 70 heats the second case 22 to raise the temperature of the lubricant in the cylindrical housing 20, even in a cold region, for example. The viscosity of the lubricant can thus be reduced. This ensures actuation of the speed reducer 11 even when the speed reducer 11 is installed on a vehicle of cold region specifications, for example. Further, since the heating unit 70 is installed using the second case 22 of the speed reducer 11, there is no need of separately providing a dedicated mounting member for installing the heating unit 70, making it possible that the speed reducer 11 has a compact shape. The speed reducer 11 can thus be mounted on various equipment, resulting in a wide range of application of the speed reducer.

Modification

Figure 3:
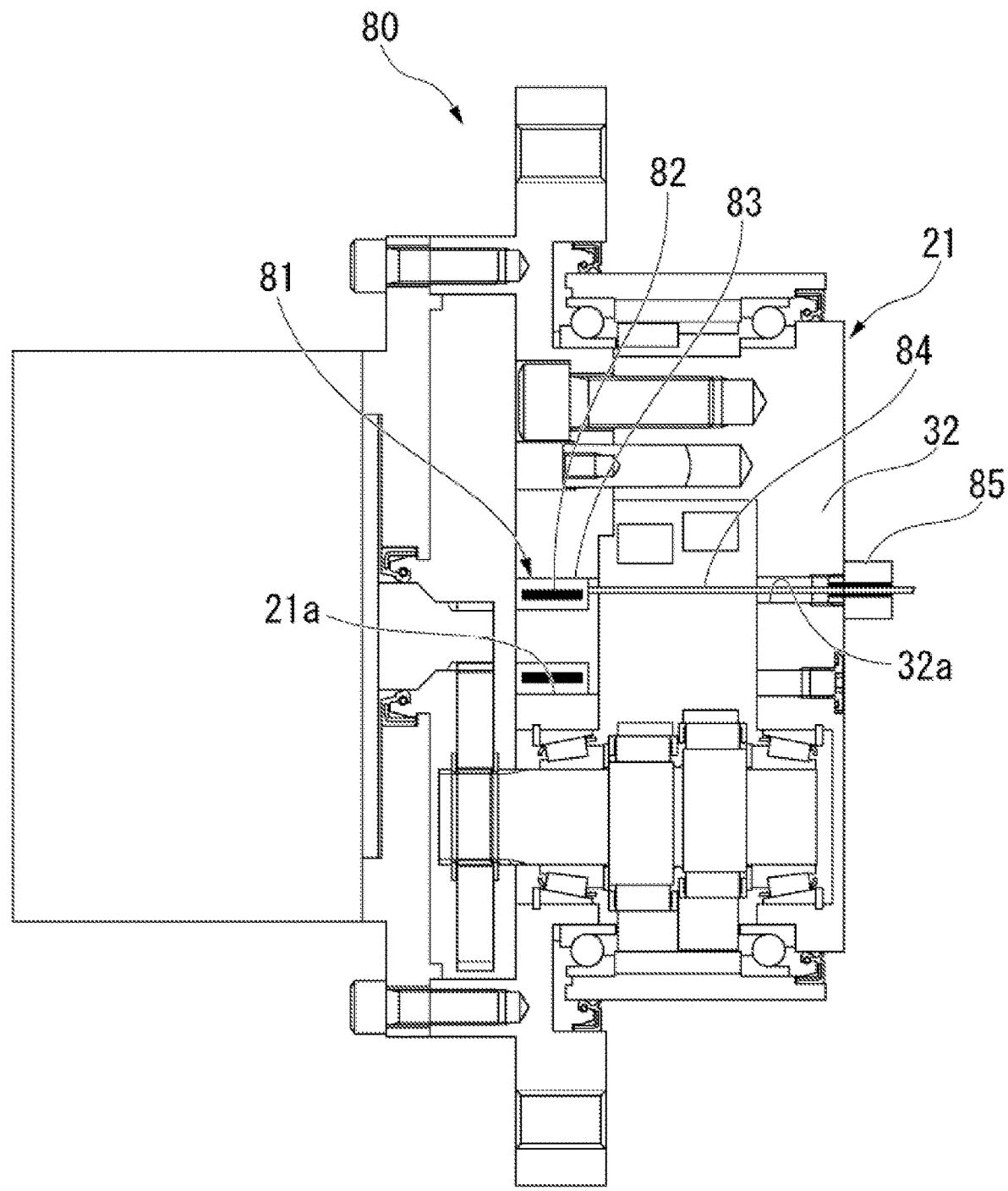
FIG. 3 is a sectional view showing a drive device according to a modification of the first embodiment of the present invention.

FIG. 3 is a sectional view showing a drive device according to a modification of the first embodiment. As shown in FIG. 3, the speed reducer 80 according to the modification has structure in which, for example, the heating unit 81 is provided (built in) along the inner peripheral surface of the through-hole 21a in the first case 21 of the cylindrical housing 20. The remaining features of the speed reducer 80 according to the modification are the same as those of the speed reducer 11 according to the first embodiment.

The heating unit 81 includes a heater (hot wire) 82 and an insulator 83. The heater 82 is connected to a power source (not shown) via a wire harness 84. The heater 82 is, for example, annularly provided on the inner peripheral surface of the through-hole 21a, and thus it is positioned inside the speed reducer 80. Therefore, the heater 82 is contacted with a lubricant inside the speed reducer 80. The insulator 83 is formed of an insulating material such as rubber and shaped to cover the heater 82. The wire harness 84 extends through the interior of the speed reducer 80 and a through-hole 32a in the base plate portion 32. The wire harness 84 extending through the through-hole 32 is fixed to the base plate portion 32 by the fixing portion 85.

The heater 82 of the heating unit 81 is positioned inside the speed reducer 80 and contacted with the lubricant. Therefore, the lubricant can be heated directly by the heater 82, and thus the temperature of the lubricant can be increased more efficiently. This ensures actuation of the speed reducer 80 even when the speed reducer 80 is installed on a vehicle of cold region specifications, for example. Further, since the heating unit 81 is installed inside the speed reducer 80 using the inner peripheral surface of the through-hole 21a of the speed reducer 80, there is no need of separately providing a dedicated mounting member for installing the heating unit 81, making it possible that the speed reducer 80 has a compact shape. The speed reducer 80 can thus be mounted on various equipment, resulting in a wide range of application of the speed reducer.

The following describes second to eleventh embodiments with reference to FIGS. 4 to 24. In the second to eleventh embodiments, the same or similar components or elements as those of the first embodiment are denoted by the same reference numerals, and detailed description thereof will be omitted.

Second Embodiment

Figure 4:
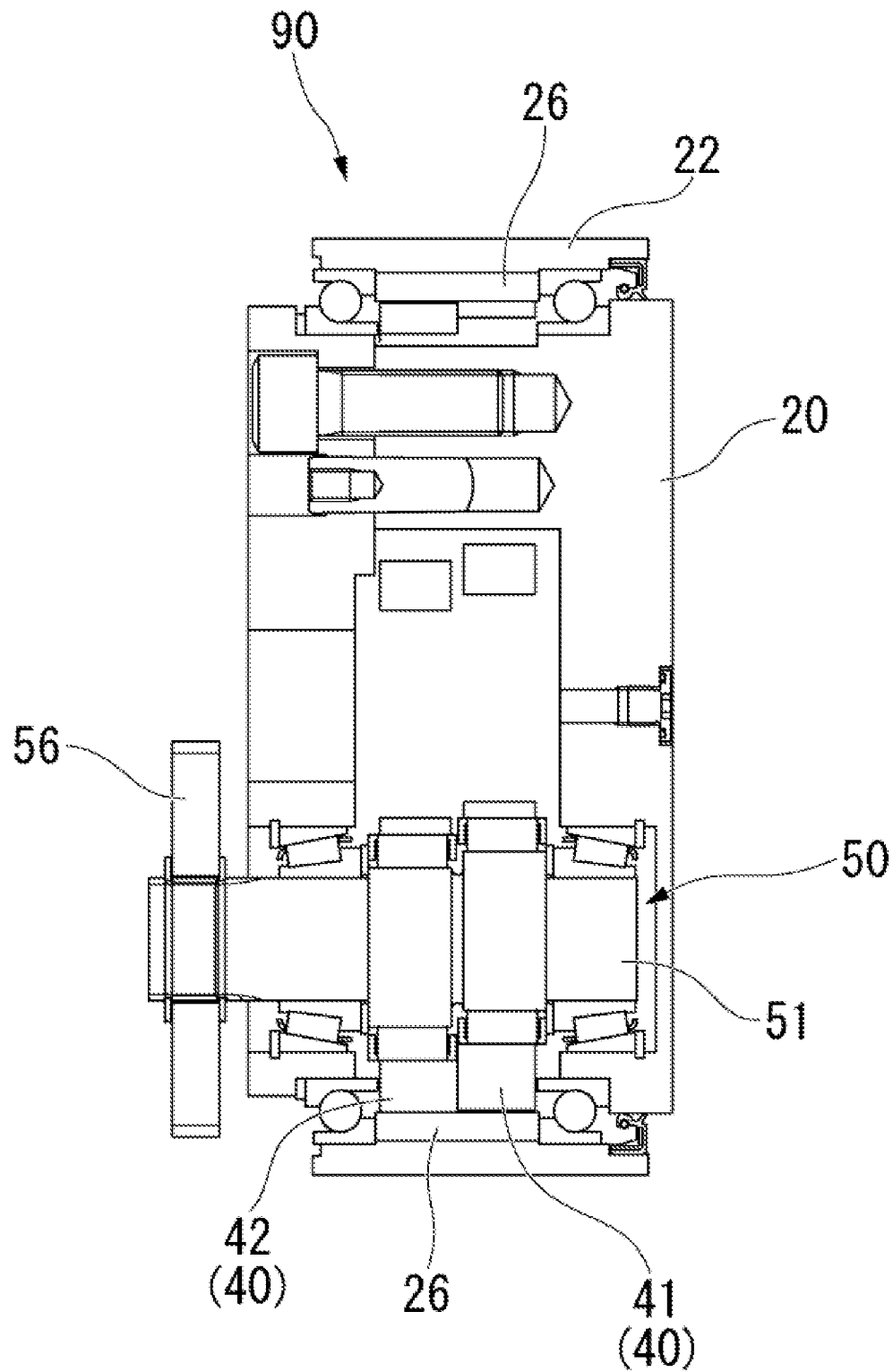
FIG. 4 is a sectional view showing a speed reducer according to a second embodiment of the present invention.

FIG. 4 is a sectional view of a speed reducer according to a second embodiment of the invention. As shown in FIG. 4, in the speed reducer 90 according to the second embodiment, the number of internal tooth pins 26 is within a range of 80 to 120, and the amount of eccentricity of the crankshaft 51 is 1.3 mm or smaller. The remaining features of the speed reducer 90 according to the second embodiment are the same as those of the speed reducer 11 according to the first embodiment.

Since the number of internal tooth pins 26 is within the range of 80 to 120, the number of internal tooth pins 26 in this embodiment is larger than the ordinary numbers of internal tooth pins. That is, the number of internal tooth pins of the second case 22 is within the range of 80 to 120. Further, the amount of eccentricity of the crankshaft 51 is 1.3 mm or smaller, which is smaller than the ordinary amounts of eccentricity. The following is the reason why the number of internal tooth pins 26 is within the range of 80 to 120 and the amount of eccentricity of the crankshaft 51 is 1.3 mm or smaller.

When the speed reducer 90 is installed in a steering device, the requirements for the speed reducer 90 installed in the steering device include a light weight, a compact size, and a high load capacity. The steering device is operated by a driver with assistance of a rotary device such as a motor. Therefore, steering is required to be performed with no discomfort in the feel or sensation on the steering wheel. Further, the speed reducer 90 contains the mechanism configured to oscillate eccentrically, and this mechanism needs to perform the eccentric oscillation smoothly.

To address these requirements, the number of internal tooth pins 26 is within the range of 80 to 120. Since the number of internal tooth pins 26 is within the range of 80 to 120, the number of internal tooth pins 26 in this embodiment is larger than the ordinary numbers of internal tooth pins. This increases the number of internal tooth pins 26 that receive loads from the gears 41, 42 of the gear unit 40. As a result, the speed reducer 90 withstands a high load, while it remains in a compact size. Also, the amount of eccentricity of the crankshaft 51 is reduced to 1.3 mm or smaller. Since the amount of eccentricity of the crankshaft 51 is reduced to 1.3 mm or smaller, it is possible to reduce the amount of vibration of the crankshaft 51 and the gear unit 40 (the gears 41, 42). This eliminates discomfort to the driver, and enables the speed reducer 90 to rotate smoothly.

Third Embodiment

Figure 5:
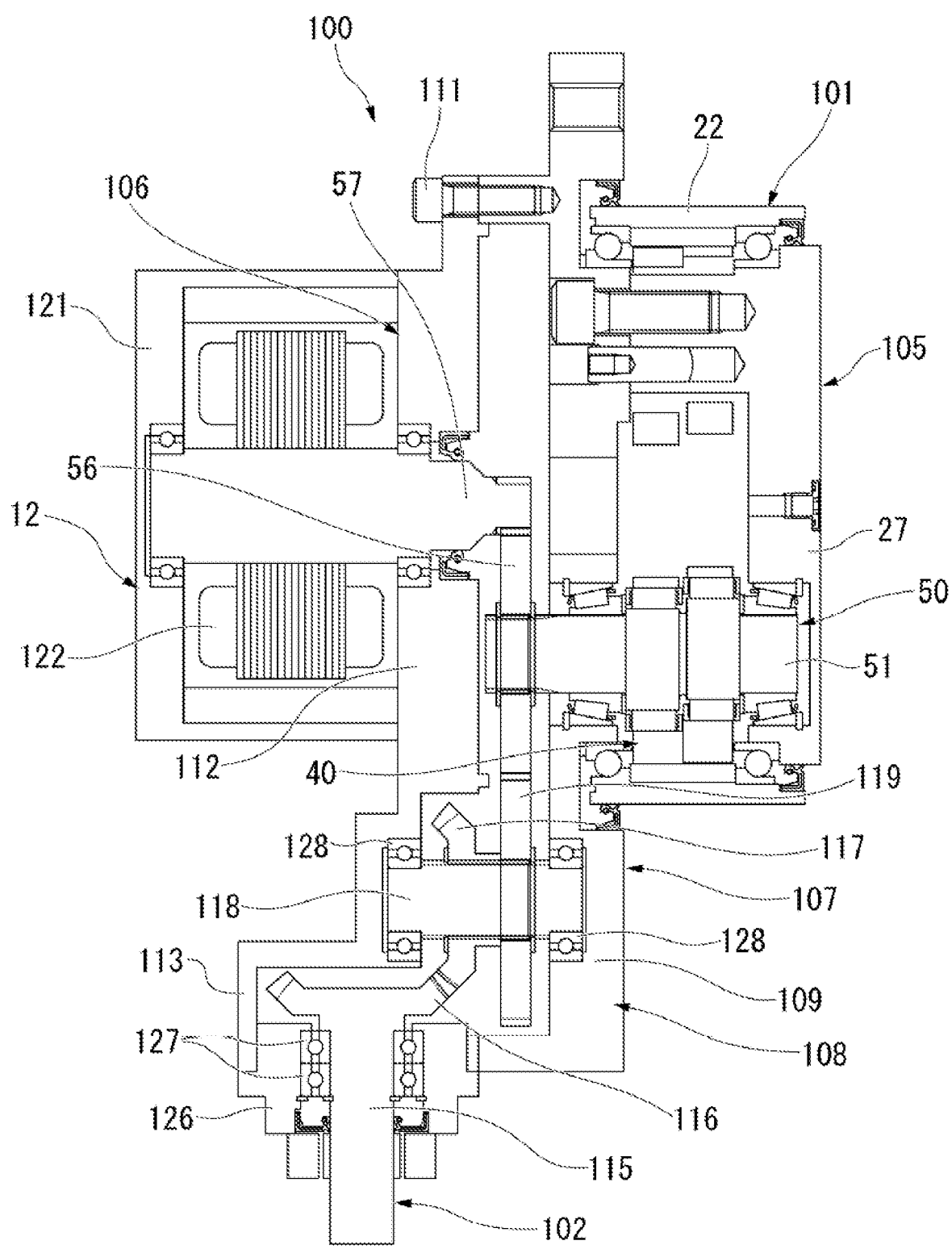
FIG. 5 is a sectional view showing a drive device according to a third embodiment of the present invention.

FIG. 5 is a sectional view showing a drive device according to a third embodiment. As shown in FIG. 5, the drive device 100 according to the third embodiment is obtained by redesigning the speed reducer 11 according to the first embodiment. Specifically, the heating unit 70 is removed, the cylindrical housing 20 is replaced with a cylindrical housing (case) 101, and an operation mechanism 102 is provided. The remaining features of the drive device 100 according to the third embodiment are the same as those of the drive device 10 according to the first embodiment.

The cylindrical housing 101 includes, for example, a first case 105, a second case 22, and a third case 106. The cylindrical housing 101 houses therein the gear unit 40 and three crank assemblies 50. In other words, the cylindrical housing forms a case of the speed reducer. The first case 105 includes, for example, a base portion 27 and an end plate portion 107. The end plate portion 107 includes a first housing case 109. The first housing case 109 forms one side of a housing case 108 that houses the operation mechanism 102. The third case 106 is tightly mounted to the end plate portion 107 by a plurality of bolts 111.

The third case 106 includes a case portion 112 and a second housing case 113. The second housing case 113 forms the other side of the housing case 108 that houses the operation mechanism 102. The first housing case 109 and the second housing case 113 form the housing case 108. The housing case 108 houses the main part of the operation mechanism 102.

The operation mechanism 102 includes an operation shaft 115, a first bevel gear 116, a second bevel gear 117, an intermediate shaft 118, and an intermediate gear 119. The operation shaft 115 is rotatably supported on a support portion 126 via bearings 127. The support portion 126 is fixed to the housing case 108. The first bevel gear 116 is formed coaxially on the distal end of the operation shaft 115. The first bevel gear 116 is meshed with the second bevel gear 117. The second bevel gear 117 is disposed coaxially on the intermediate shaft 118. The intermediate shaft 118 is disposed orthogonal to the operation shaft 115 and is rotatably supported on the housing case 108 via bearings 128. The intermediate gear 119 is disposed coaxially on the intermediate shaft 118. The intermediate gear 119 is meshed with the transmission gear 56.

The operation mechanism 102 is an orthogonal input portion in which the intermediate shaft 118 is disposed orthogonal to the operation shaft 115. The operation mechanism 102 operates as follows. For example, when a driver operates and thus rotates the operation shaft 115, the rotational force of the operation shaft 115 is transmitted to the first bevel gear 116. The rotational force of the first bevel gear 116 is transmitted to the transmission gear 56 via the second bevel gear 117, the intermediate shaft 118, and the intermediate gear 119.

The rotary device 12 is mounted to the case portion 112 of the third case 106. The rotary device 12 includes a device case 121 and a device body 122. The device case 121 has a U-shaped cross section that is open at the portion facing the case portion 112. The device case 121 houses the device body 122. The opening in the device case 121 is covered by the case portion 112. The case portion 112 thus forms a part of the case of the speed reducer and also forms a part of the device case 121. The following is the reason why the case portion 112, which forms a part of the case of the speed reducer, forms a part of the case of the rotary device 12.

In a typical rotary device (such as a motor), the whole of a device body (such as a motor body) is covered by a mechanism case. Therefore, at the portion where the rotary device is mounted to the speed reducer, the case of the speed reducer and the case of the rotary device overlap with each other. Further, for example, screw holes need to be formed in the case of the speed reducer in order to mount the case of the rotary device to the case of the speed reducer with bolts or the like. The case of the speed reducer thus has a large wall thickness.

The drive shaft of the rotary device extends through the case of the rotary device and the case of the speed reducer into the speed reducer. Therefore, the drive shaft of the rotary device may possibly be long, leading to a high inertia. This may possibly cause a large load on the rotary device. Further, since the case of the speed reducer and the case of the rotary device overlap with each other, it is difficult to make the drive device flat (i.e., compact).

To address these problems, the case portion 112, which is a portion of the cylindrical housing 101 of the speed reducer that faces the rotary device 12, is also used as a portion of the case of the rotary device 12. Therefore, only the case portion 112 is interposed between the speed reducer and the rotary device 12. This arrangement makes it possible to reduce the length of the drive shaft 57 of the rotary device 12 and thus reduce the inertia, leading to a reduced load on the rotary device. In addition, the drive device 100 can be made flat (i.e., compact).

Fourth Embodiment

Figure 6:
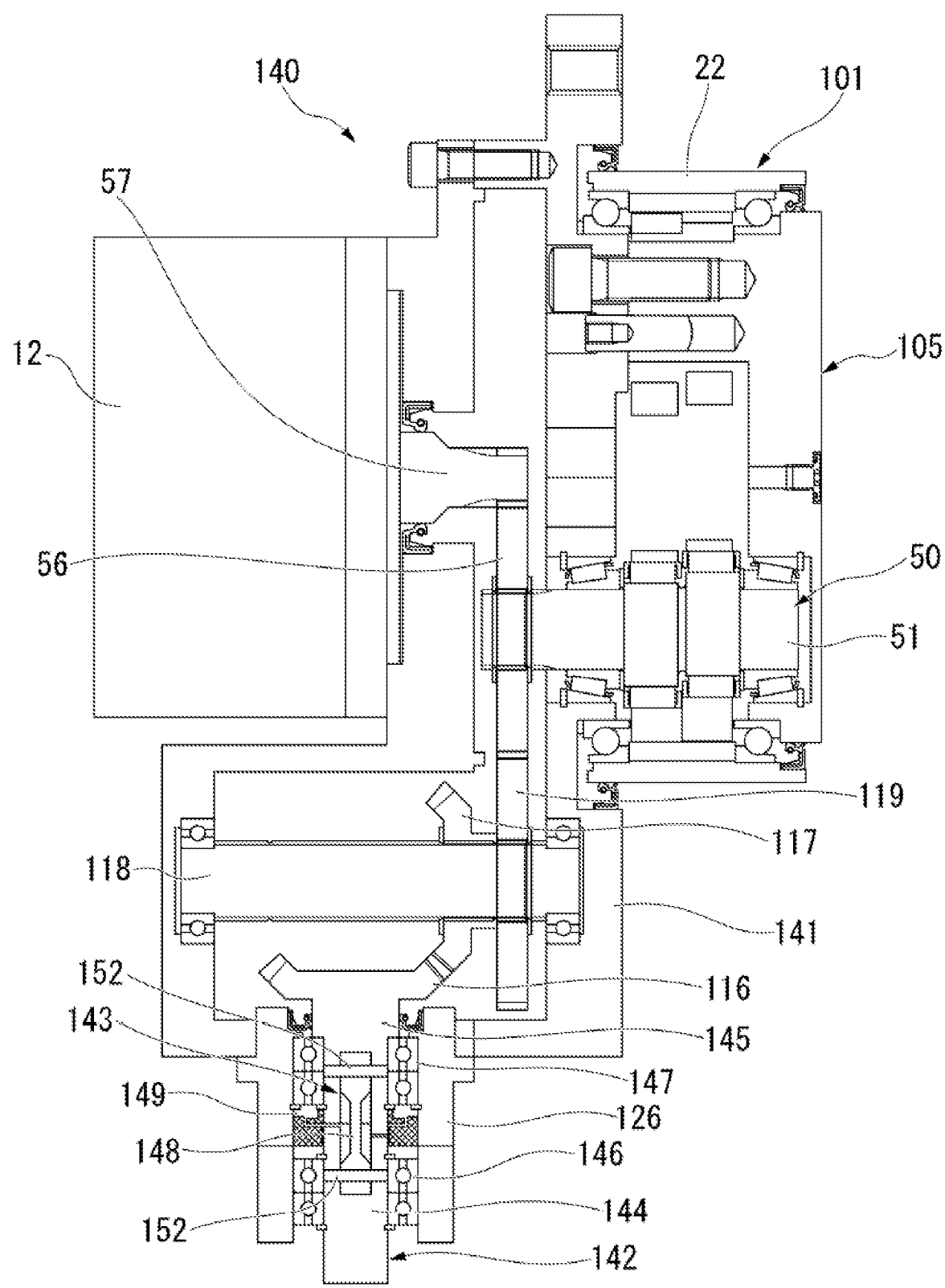
FIG. 6 is a sectional view showing a drive device according to a fourth embodiment of the present invention.

FIG. 6 is a sectional view showing a drive device according to a fourth embodiment. As shown in FIG. 6, the drive device 140 according to the fourth embodiment is obtained by redesigning the drive device 100 according to the third embodiment. Specifically, the housing case 108 is replaced with a housing case 141, the operation mechanism 102 is replaced with an operation mechanism 142, and a sensing unit 143 is provided. The remaining features of the drive device 140 according to the fourth embodiment are the same as those of the drive device 100 according to the third embodiment.

Since the housing case 141 is formed in the same manner as the housing case 108 according to the third embodiment, detailed description of the housing case 141 will be omitted. In the operation mechanism 142, the operation shaft 115 according to the third embodiment is divided into a first operation shaft 144 and a second operation shaft 145. The first operation shaft 144 is rotatably supported on a support portion 126 via bearings 146. The proximal end portion of the first operation shaft 144 is projected from the support portion 126 to the outside of the housing case 108. The second operation shaft 145 is rotatably supported on the support portion 126 via bearings 147. The second operation shaft 145 has a first bevel gear 116 provided coaxially on the distal end portion thereof.

The sensing unit 143 includes, for example, a torsion bar 148 and a rotor 149 provided on the distal end portion of the first operation shaft 144 and the proximal end portion of the second operation shaft 145. The torsion bar 148 is received, for example, in a receiving hole in the distal end portion of the first operation shaft 144 and a receiving hole in the proximal end portion of the second operation shaft 145. The torsion bar 148 is fixed to the first operation shaft 144 and the second operation shaft 145 with spring pins 152, for example. The sensing unit 143 senses, for example, the rotation angles of the first operation shaft 144 and the second operation shaft 145, using the rotor 149 or the like. The sensing unit 143 senses, for example, the torques generated in the first operation shaft 144 and the second operation shaft 145 concurrently with the rotation angles, using the torsion bar 148 or the like. The following is the reason why the sensing unit 143 is provided for the first operation shaft 144 and the second operation shaft 145 of the operation mechanism 142.

There is a demand that a steering device of a vehicle include sensors (such as a sensing unit for sensing rotation angles and torques) for performing automatic steering and assist control for automatic driving and electrification. Therefore, sensors that can be installed in equipment spaces within existing vehicles are required. Further, because of the structure of the existing vehicles, for example, the crankshaft (rotational shaft) 51 of the speed reducer is disposed orthogonal to the first operation shaft 144 and the second operation shaft 145 connected to the steering wheel. Therefore, for example, the first bevel gear 116 is provided on the second operation shaft 145 of the operation mechanism 142, and the sensing unit 143 is provided on the first operation shaft 144 and the second operation shaft 145.

With this arrangement, the operation mechanism 142 including the first bevel gear 116 and the sensing unit 143 is made compact. Therefore, the sensors (such as the sensing unit 143) necessary for the automatic steering and assist control can be installed in small spaces within the existing vehicles, and input through orthogonal shafts is possible from the first operation shaft 144 connected to the steering wheel. Specifically, for example, the sensing unit 143 senses the rotational angle and the torque when the first operation shaft 144 is operated and a rotational force is input to the crankshaft 51. The rotary device 12 is controlled based on the rotational angle and the torque sensed by the sensing unit 143, such that the rotary device 12 can actuate the speed reducer. In this way, the sensing unit 143 and the rotary device 12 can assist the operation of the driver.

Fifth Embodiment

Figure 7:
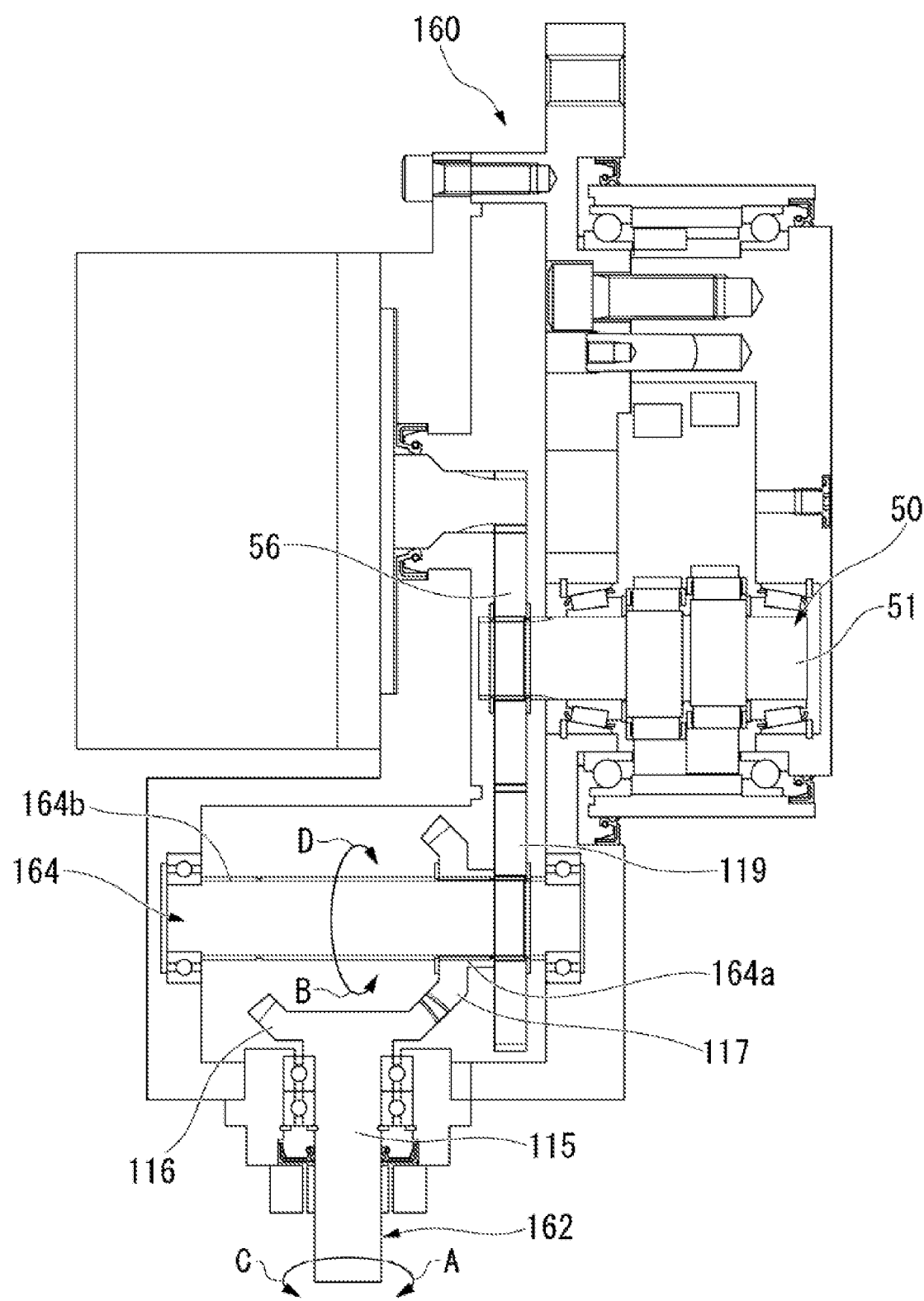
FIG. 7 is a sectional view showing an example according to a fifth embodiment of the present invention in which a driven bevel gear is positioned on the speed reducer side.
Figure 8:
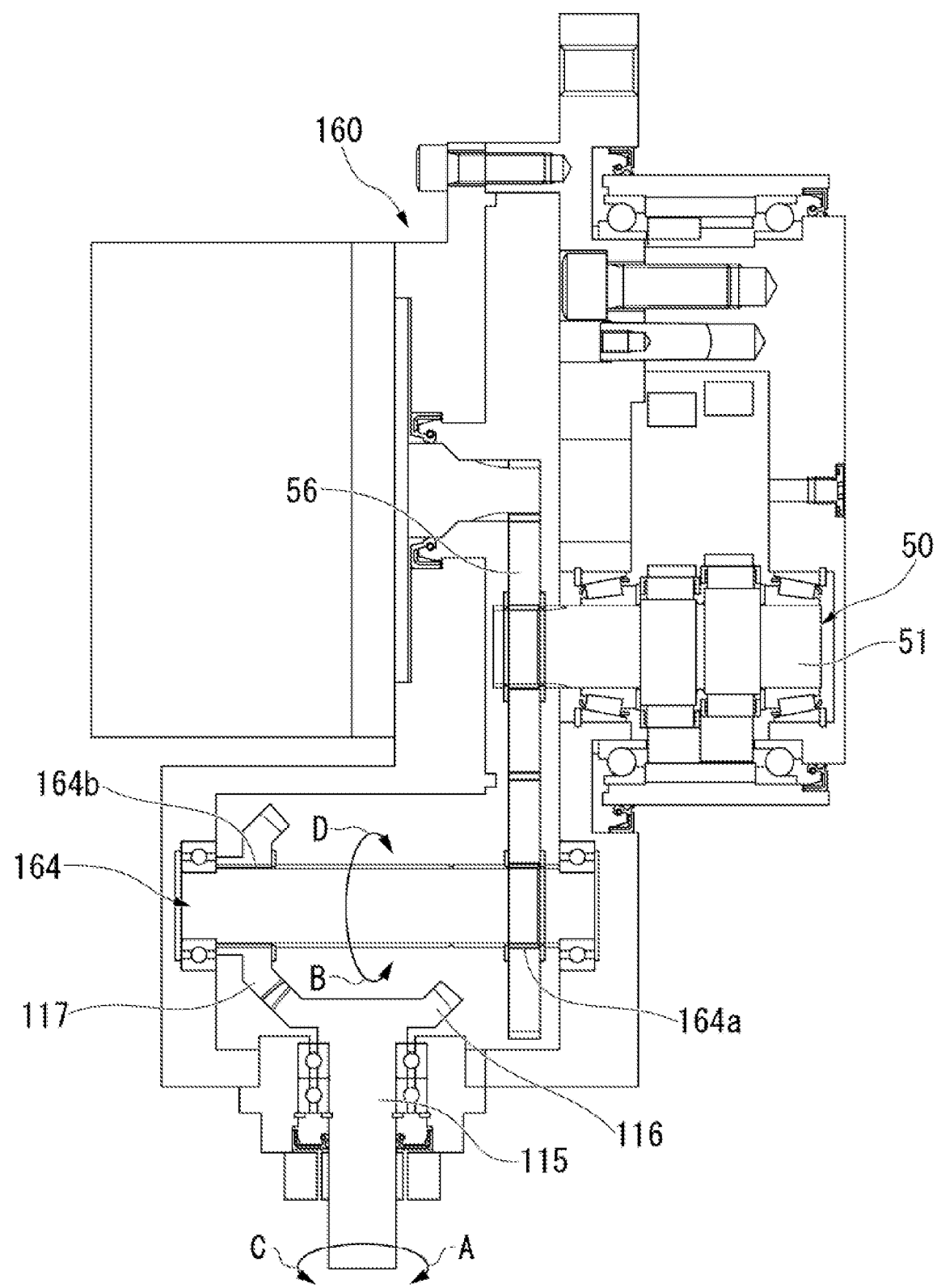
FIG. 8 is a sectional view showing an example according to the fifth embodiment of the present invention in which the driven bevel gear is positioned on the side opposite to the speed reducer.

FIG. 7 is a sectional view showing an example of a drive device according to a fifth embodiment in which a driven bevel gear is positioned on the speed reducer side. FIG. 8 is a sectional view showing an example of the drive device according to the fifth embodiment in which the driven bevel gear is positioned on the side opposite to the speed reducer. As shown in FIG. 7, in the drive device 160 according to the fifth embodiment, the operation mechanism 142 of the fourth embodiment is replaced with an operation mechanism 162. The remaining features of the drive device 160 according to the fifth embodiment are the same as those of the drive device 140 according to the fourth embodiment.

The operation mechanism 162 is obtained by redesigning the operation mechanism 142 according to the fourth embodiment. Specifically, the sensing unit 143 is removed, the first operation shaft 144 and the second operation shaft 145 are replaced with an operation shaft 115, and the intermediate shaft 118 is replaced with an intermediate shaft 164. The intermediate shaft 164 has first catching portions formed in its outer peripheral surface at a first meshing position 164*a* and a second meshing position 164*b*. The first catching portions are formed of a spline, serration, key groove or the like. The first meshing position 164*a* is at an end of the intermediate shaft 164 on the intermediate gear 119 (or the speed reducer) side. The second meshing position 164*b* is at an end of the intermediate shaft 164 on the side opposite to the intermediate gear 119 (or the speed reducer).

The second bevel gear (the driven bevel gear) 117 has a second catching portion formed in its inner peripheral surface. The second catching portion is formed of a spline, serration, key groove or the like. The second catching portion is formed to engage with the first catching portions at the first meshing position 164*a* and the second meshing position 164*b*. The second bevel gear 117 can thus be removably mounted to the first meshing position 164*a* and the second meshing position 164*b* of the intermediate shaft 164 in different orientations. In other words, the second bevel gear 117 can be mounted switchably to the first meshing position 164*a* and the second meshing position 164*b* in different orientations.

As shown in FIG. 7, the second bevel gear 117 is mounted to the first meshing position 164*a*. Therefore, in the drive device 160, when a rotational force in the clockwise direction, or the direction of the arrow A, is transmitted to the operation shaft 115 of the operation mechanism 162, the rotational force of the operation shaft 115 is transmitted to the first bevel gear (the driving bevel gear) 116. Because of the rotational force of the first bevel gear 116, the second bevel gear 117 and the intermediate shaft 164 receive a rotational force in the direction of the arrow B. The rotational force of the intermediate shaft 164 is transmitted to the transmission gear 56 via the intermediate gear 119. When a rotational force in the counterclockwise direction, or the direction of the arrow C, is transmitted to the operation shaft 115, the rotational force of the operation shaft 115 is transmitted to the first bevel gear 116. Because of the rotational force of the first bevel gear 116, the second bevel gear 117 and the intermediate shaft 164 receive a rotational force in the direction of the arrow D.

As shown in FIG. 8, the second bevel gear 117 is mounted to the second meshing position 164*b*. Therefore, in the drive device 160, when a rotational force in the clockwise direction, or the direction of the arrow A, is transmitted to the operation shaft 115 of the operation mechanism 162, the rotational force of the operation shaft 115 is transmitted to the first bevel gear 116. Because of the rotational force of the first bevel gear 116, the second bevel gear 117 and the intermediate shaft 164 receive a rotational force in the direction of the arrow D. The rotational force of the intermediate shaft 164 is transmitted to the transmission gear 56 via the intermediate gear 119. When a rotational force in the counterclockwise direction, or the direction of the arrow C, is transmitted to the operation shaft 115, the rotational force of the operation shaft 115 is transmitted to the first bevel gear 116. Because of the rotational force of the first bevel gear 116, the second bevel gear 117 and the intermediate shaft 164 receive a rotational force in the direction of the arrow B. As shown in FIGS. 7 and 8, the rotational direction of the second bevel gear 117 relative to the rotation of the first bevel gear 116 can be reversed by only switching the second bevel gear 117 between the first meshing position 164*a* and the second meshing position 164*b* of the intermediate shaft 164.

Steering devices are designed differently for a right-hand steering wheel and a left-hand steering wheel depending on the types of the vehicles and the countries where the vehicles are used. Therefore, the steering devices are redesigned for the difference between a right-hand steering wheel and a left-hand steering wheel. To be designed for both a right-hand steering wheel and a left-hand steering wheel, the steering devices are modified in the layout for installation of the operation mechanism on the vehicles or the screwing direction of built-in ball screws for steering.

In the operation mechanism 162, the rotational direction of the second bevel gear 117 relative to the rotation of the first bevel gear 116 can be reversed by only switching the second bevel gear 117 between the first meshing position 164*a* and the second meshing position 164*b* of the intermediate shaft 164. This arrangement makes it possible to change the rotation of the second bevel gear 117 without any modification in design of the components, except for the change in the mounting position of the second bevel gear 117. Also, the operation mechanism 16 can be made compact, and thus the drive device 160 can also be made compact.

Sixth Embodiment

Figure 9:
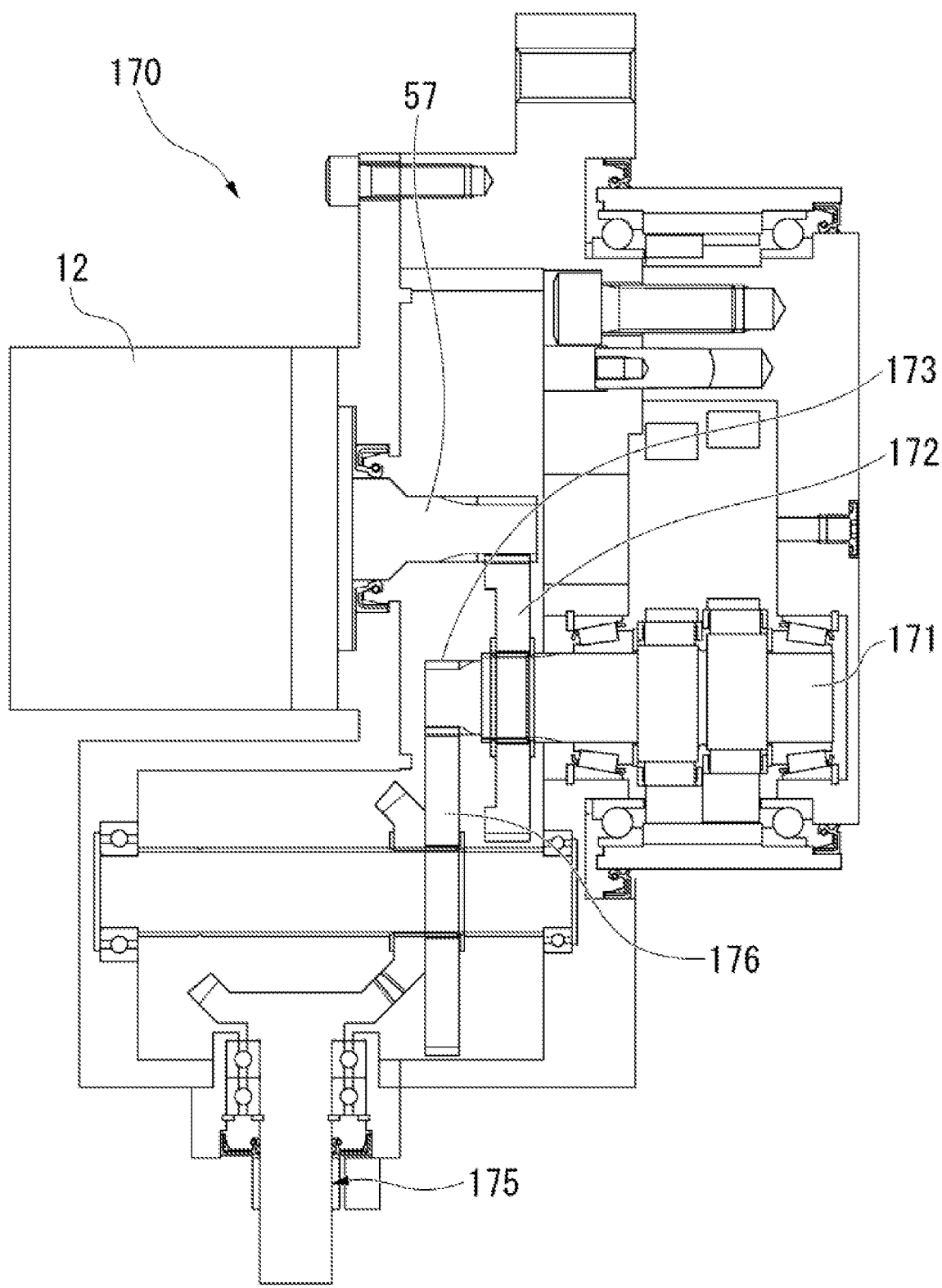
FIG. 9 is a sectional view showing a drive device according to a sixth embodiment of the present invention.

FIG. 9 is a sectional view showing a drive device according to a sixth embodiment. As shown in FIG. 9, in the drive device 170 according to the sixth embodiment, the crankshaft 51 of the fifth embodiment is replaced with a crankshaft 171. The remaining features of the drive device 170 according to the sixth embodiment are the same as those of the drive device 160 according to the fifth embodiment. The crankshaft 171 includes a first transmission gear 172 and a second transmission gear 173 provided at the end of the crankshaft 171 on the rotary device 12 side.

The first transmission gear 172 is a spur gear mounted to the end of the crankshaft 171. The first transmission gear 172 meshes with a gear on the drive shaft 57 of the rotary device 12. The first transmission gear 172 thus receives an input of rotational force from the rotary device 12. In this way, the rotational force input from the rotary device 12 is transmitted by the first transmission gear 172 and input to the crankshaft 171.

The second transmission gear 173 is a pinion formed (worked) at the end of the crankshaft 171, so as to be adjacent to the first transmission gear 172. The second transmission gear 173 is meshed with an intermediate gear 176 of an operation mechanism 175. In the operation mechanism 175, the intermediate gear 119 of the operation mechanism 162 according to the fifth embodiment is replaced with the intermediate gear 176. The second transmission gear 173 receives a rotational force from the operation mechanism 175. In this way, the rotational force input from the operation mechanism 175 is transmitted by the second transmission gear 173 and input to the crankshaft 171. Since the first transmission gear 172 and the second transmission gear 173 are provided adjacent to each other at the end of the crankshaft 171, the crankshaft 171 (i.e., the speed reducer) receives rotational forces from two systems, the rotary device 12 and the operation mechanism 175.

In conventional arrangement in which the crankshaft of the speed reducer receives rotational forces from two systems, the rotary device and the operation mechanism, a transmission gear for input of the rotational force from the rotary device is provided at one end of the crankshaft, and a transmission gear for input of the rotational force from the operation mechanism is provided at the other end of the crankshaft, for example. Therefore, the crankshaft is elongated in the axial direction. In addition, the rotary device and the operation mechanism are positioned vertically opposite to each other. Therefore, the drive device with the speed reducer has a large size as a unit. In particular, when the drive device with the speed reducer is applied to a steering device, the rotary device (motor) may be positioned on the road surface side, and there is a high risk of damage due to hitting stones and muddy water from the road surface.

To address this problem, the first transmission gear 172 and the second transmission gear 173 are disposed adjacent to each other at the end of the crankshaft 171. With this arrangement, the crankshaft 171 (i.e., the speed reducer) can receive the rotational forces from the two systems, the rotary device 12 and the operation mechanism 175, while keeping the compact shape of the drive device 170. In addition, the rotary device 12 can be positioned in the upper portion and thus prevented from being affected by hitting stones or the like.

Modification 1

Figure 10:
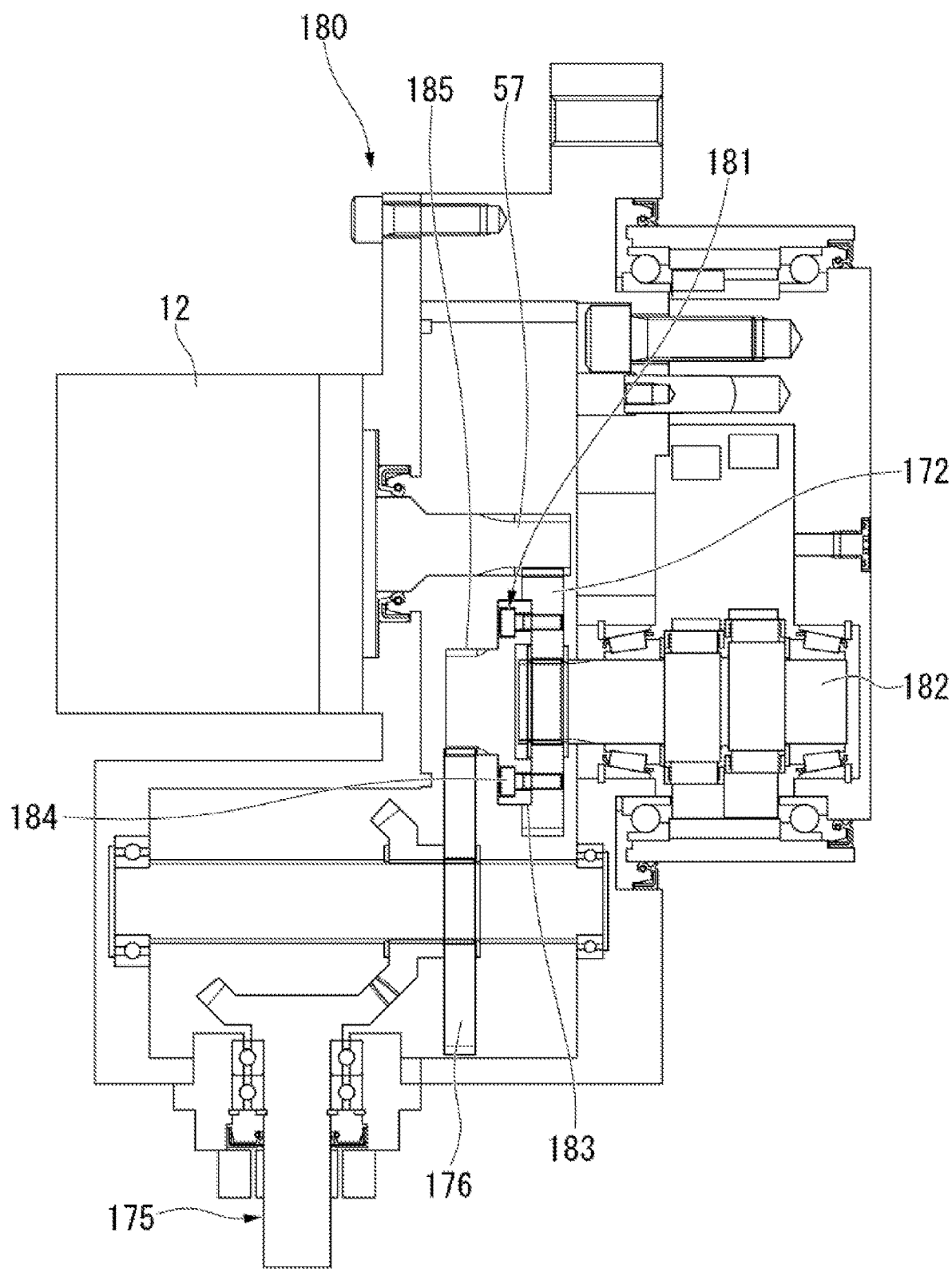
FIG. 10 is a sectional view showing a drive device according to Modification 1 of the sixth embodiment of the present invention.

FIG. 10 is a sectional view showing a drive device according to Modification 1 of the sixth embodiment. As shown in FIG. 10, in the drive device 180 according to Modification 1, the second transmission gear 173 of the sixth embodiment is replaced with a second transmission gear 181. The remaining features of the drive device 180 according to Modification 1 are the same as those of the drive device 170 according to the sixth embodiment.

Specifically, in the drive device 180, the first transmission gear 172 is mounted to an end of a crankshaft 182. A flange 183 of a second transmission gear 181 is mounted to the first transmission gear 172 with a plurality of bolts 184. The second transmission gear 181 has a pinion 185 formed (worked) at its projecting portion. Therefore, the second transmission gear 181 (specifically, the pinion 185) is disposed adjacent to the first transmission gear 172 at the end of the crankshaft 182. The pinion 185 is meshed with the intermediate gear 176.

In this way, the first transmission gear 172 and the second transmission gear 181 are disposed adjacent to each other at the end of the crankshaft 182. With this arrangement, the crankshaft 182 (i.e., the speed reducer) can receive the rotational forces from the two systems, the rotary device 12 and the operation mechanism 175, while keeping the compact shape of the drive device 180. In addition, the rotary device 12 can be positioned in the upper portion and thus prevented from being affected by hitting stones or the like.

Modification 2

Figure 11:
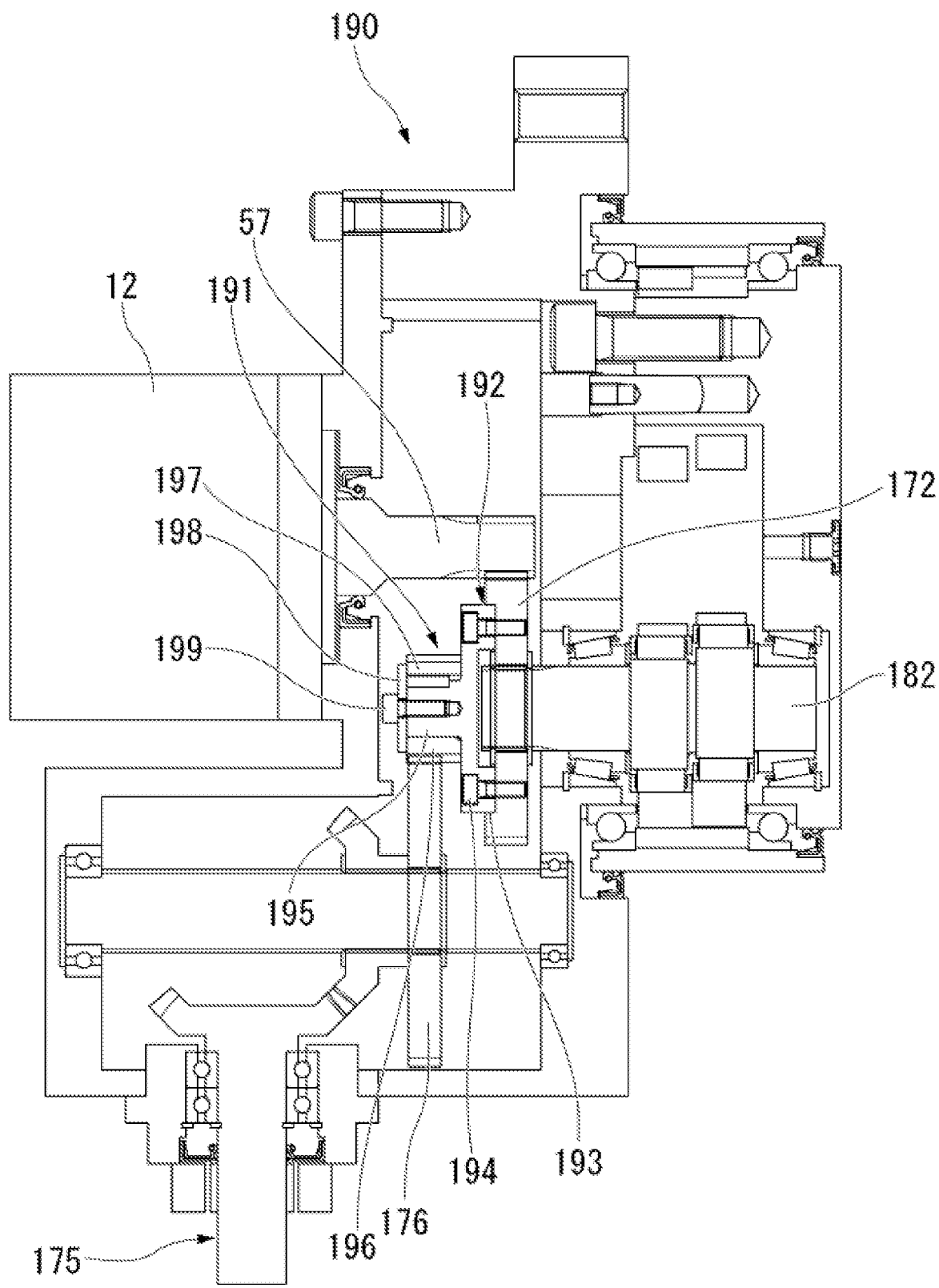
FIG. 11 is a sectional view showing a drive device according to Modification 2 of the sixth embodiment of the present invention.

FIG. 11 is a sectional view showing a drive device according to Modification 2 of the sixth embodiment. As shown in FIG. 11, in the drive device 190 according to Modification 2, the second transmission gear 181 of Modification 1 is replaced with a second transmission portion 191. The remaining features of the drive device 190 according to Modification 2 are the same as those of the drive device 180 according to Modification 1.

The second transmission portion 191 includes a connecting portion 192 and a second transmission gear 196. A flange 193 of the connecting portion 192 is mounted to the first transmission gear 172 with a plurality of bolts 194. The connecting portion 192 includes a projecting portion 195 on which the second transmission gear 196 having an annular shape is fitted. The projecting portion 195 and the second transmission gear 196 are fixed to each other with a key 197. The second transmission gear 196 is meshed with the intermediate gear 176. A plate 198 is fixed to a convex surface of the projecting portion 195 with a bolt 199.

In this way, the first transmission gear 172 and the second transmission gear 196 are disposed adjacent to each other at the end of the crankshaft 182. With this arrangement, the crankshaft 182 (i.e., the speed reducer) can receive the rotational forces from the two systems, the rotary device 12 and the operation mechanism 175, while keeping the compact shape of the drive device 190. In addition, the rotary device 12 can be positioned in the upper portion and thus prevented from being affected by hitting stones or the like.

Modification 3

Figure 12:
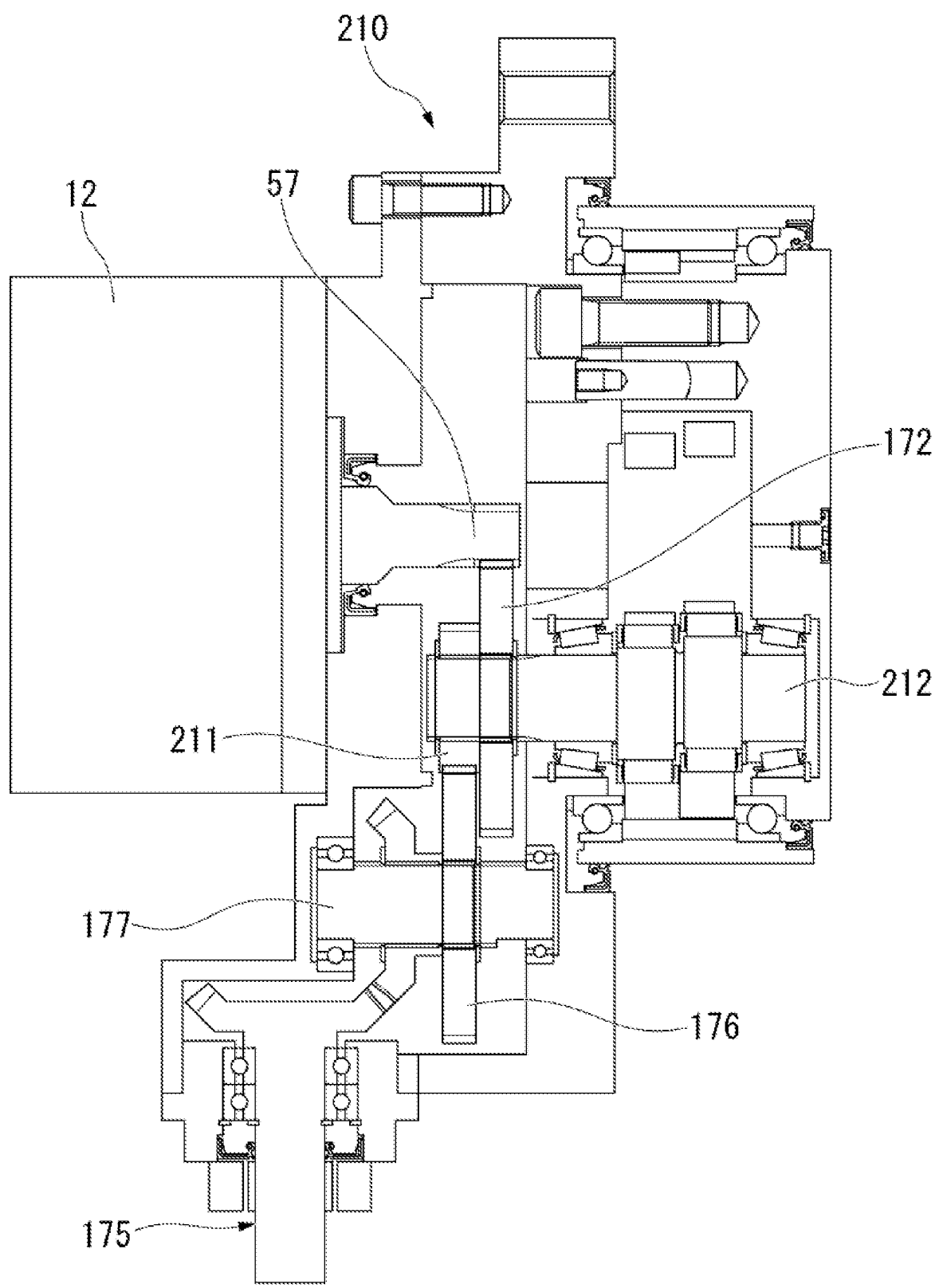
FIG. 12 is a sectional view showing a drive device according to Modification 3 of the sixth embodiment of the present invention.

FIG. 12 is a sectional view showing a drive device according to Modification 3 of the sixth embodiment. As shown in FIG. 12, in the drive device 210 according to Modification 3, the second transmission gear 173 of the sixth embodiment is replaced with a second transmission gear 211. The remaining features of the drive device 210 according to Modification 3 are the same as those of the drive device 170 according to the sixth embodiment.

A crankshaft 212 of the drive device 210 has an engaging portion such as a spline or serration at an end thereof. The first transmission gear 172 and the second transmission gear 211 are disposed adjacent to each other at the end of the crankshaft 212. The second transmission gear 211 is meshed with the intermediate gear 176. The intermediate gear 176 is disposed on the intermediate shaft 177.

In this way, the first transmission gear 172 and the second transmission gear 211 are disposed adjacent to each other at the end of the crankshaft 212. With this arrangement, the crankshaft 212 (i.e., the speed reducer) can receive the rotational forces from the two systems, the rotary device 12 and the operation mechanism 175, while keeping the compact shape of the drive device 210. In addition, the rotary device 12 can be positioned in the upper portion and thus prevented from being affected by hitting stones or the like.

Modification 4

Figure 13:
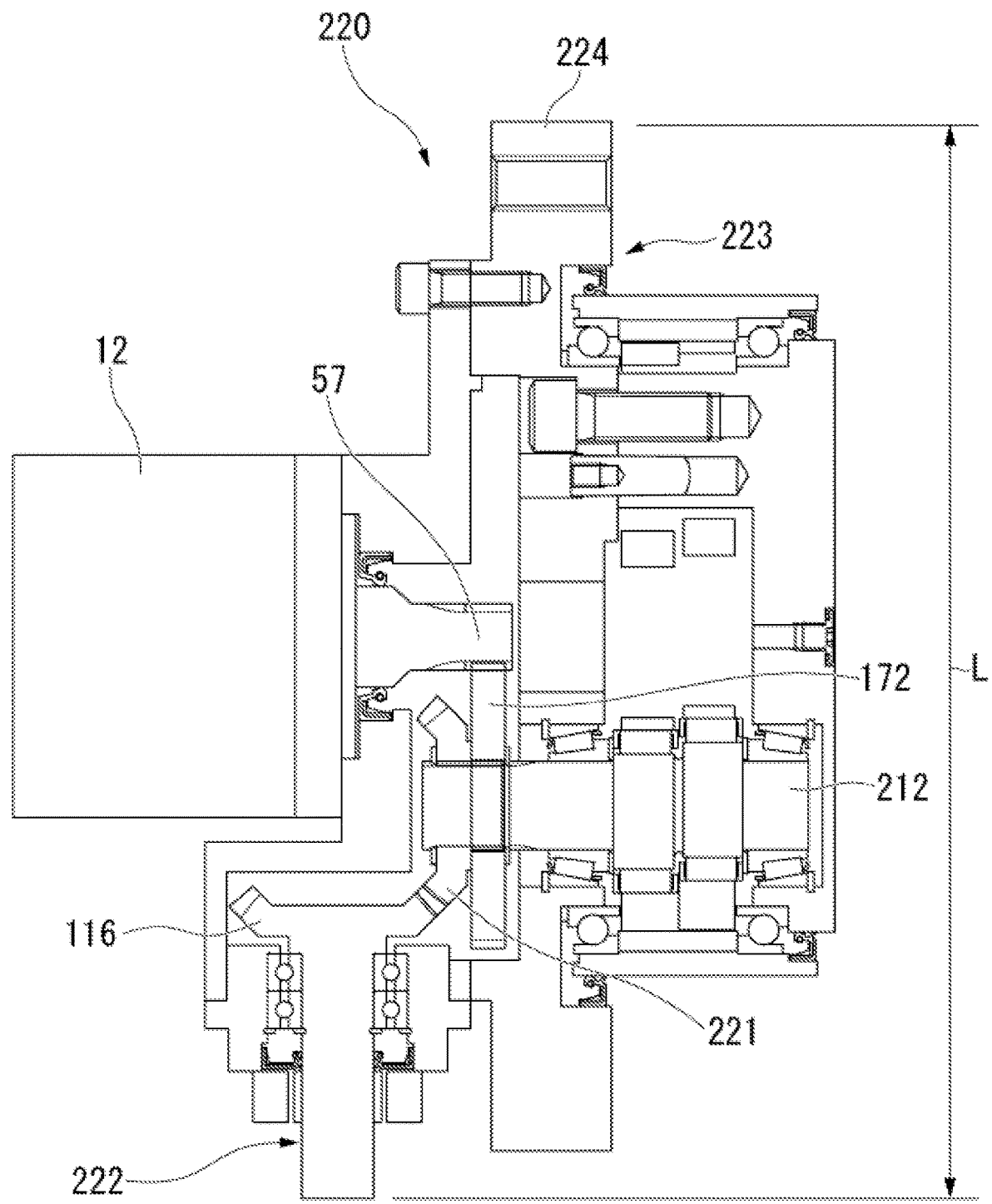
FIG. 13 is a sectional view showing a drive device according to Modification 4 of the sixth embodiment of the present invention.

FIG. 13 is a sectional view showing a drive device according to Modification 4 of the sixth embodiment. As shown in FIG. 13, in the drive device 220 according to Modification 4, the second transmission gear 211 of the sixth embodiment is replaced with a second transmission gear 221. The remaining features of the drive device 220 according to Modification 4 are the same as those of the drive device 210 according to Modification 3.

The second transmission gear 221 is mounted to the end of the crankshaft 212 so as to be adjacent to the first transmission gear 172. The second transmission gear 221 has a form of a bevel gear and is meshed with the first bevel gear 116. Since the second transmission gear 221 having a form of a bevel gear is mounted to the end of the crankshaft 212, the intermediate gear 176 and the intermediate shaft 177 can be removed from the operation mechanism 175 of Modification 3. This reduces the distance L from the operation mechanism 222 to the flange 224 of the cylindrical housing (case) 223 in Modification 4.

In this way, the first transmission gear 172 and the second transmission gear 221 are disposed adjacent to each other at the end of the crankshaft 212. With this arrangement, the crankshaft 212 (i.e., the speed reducer) can receive the rotational forces from the two systems, the rotary device 12 and the operation mechanism 222, while keeping the compact shape of the drive device 220. In addition, the rotary device 12 can be positioned in the upper portion and thus prevented from being affected by hitting stones or the like. Further, since the second transmission gear 221 has a form of a bevel gear, the distance L from the operation mechanism 222 to the flange 224 can be reduced, and thus the shape of the drive device 220 can be more compact.

Seventh Embodiment

Figure 14:
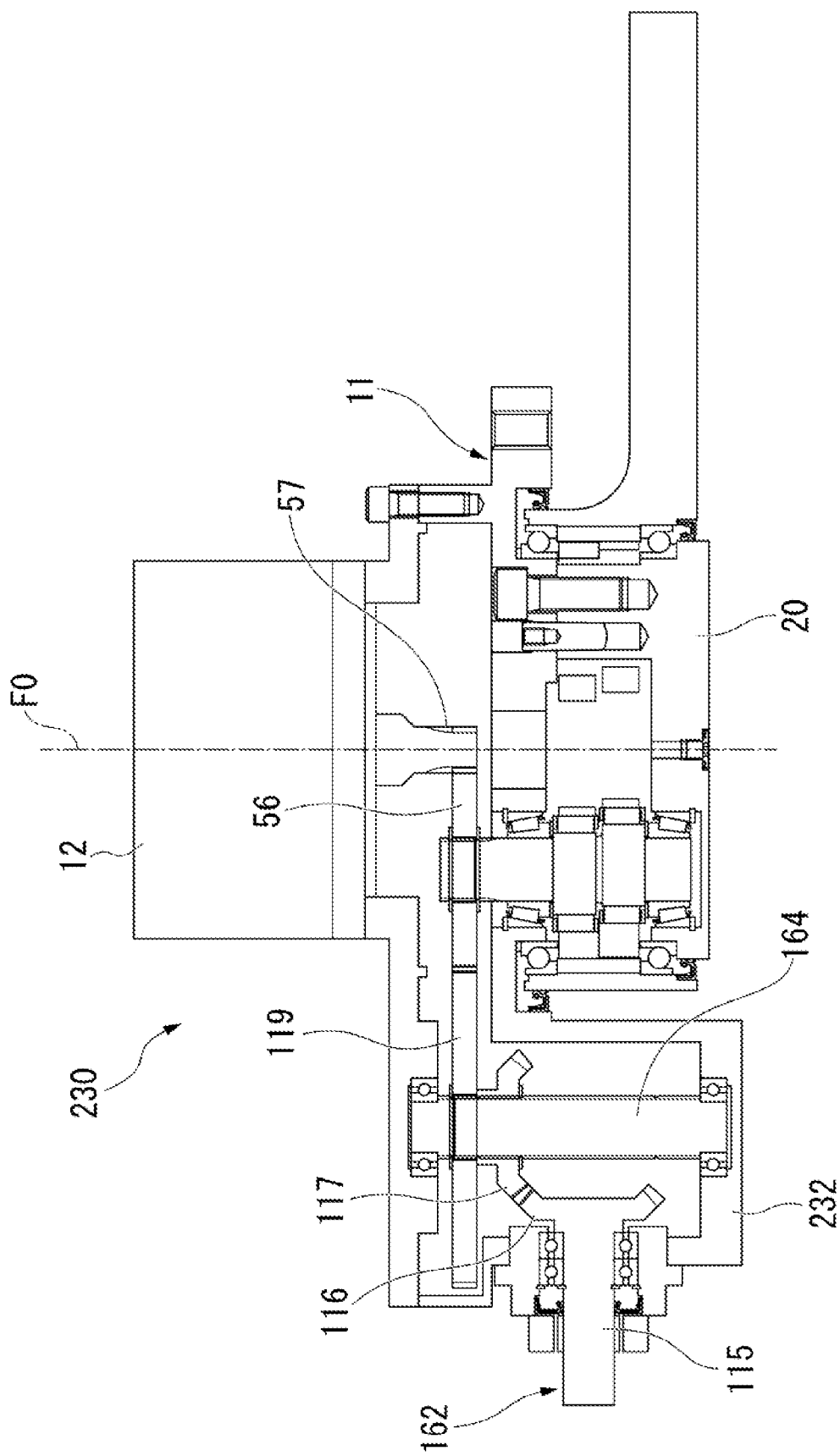
FIG. 14 is a sectional view showing a drive device according to a seventh embodiment of the present invention.

FIG. 14 is a sectional view showing a drive device according to a seventh embodiment. As shown in FIG. 14, in the drive device 230 according to the seventh embodiment, the drive device 160 according to the fifth embodiment shown in FIG. 8 is disposed sideways, and the operation mechanism 162 is positioned lateral to the speed reducer 11. The remaining features of the drive device 230 according to the seventh embodiment are the same as those of the drive device 160 according to the fifth embodiment.

The drive device 230 is disposed such that the main axis F0 of the speed reducer 11 is oriented in the vertical direction. Therefore, the transmission gear 56 is positioned above the cylindrical housing 20 (specifically, the end plate portion 28) of the speed reducer 11. The transmission gear 56 is meshed with the drive shaft 57. Since the drive shaft 57 is oriented in the vertical direction, the rotary device 12 is positioned above the speed reducer 11.

The transmission gear 56 is also meshed with the intermediate gear 119. The intermediate gear 119 is mounted to the top end of the intermediate shaft 164. The intermediate shaft 164 is oriented in the vertical direction. The second bevel gear 117 is mounted to the intermediate shaft 164 so as to be below and adjacent to the intermediate gear 119. The second bevel gear 117 is meshed with the first bevel gear 116. The operation shaft 115 having the first bevel gear 116 provided thereon is positioned below the second bevel gear 117. Therefore, the operation mechanism 162 is positioned lateral to the speed reducer 11. The main part of the operation mechanism 162 is housed in a housing case 232. The housing case 232 is positioned lateral to the speed reducer 11. The inside of the speed reducer 11 (i.e., the cylindrical housing 20) and the inside of the housing case 232 store a lubricant for lubricating the meshing components and the like.

For a typical rotary device (motor) and drive device for example, an oil seal is provided on a drive shaft portion of the rotary device to prevent the lubricant in the speed reducer from entering the rotary device. Since the drive shaft of a rotary device is driven at a high speed, the oil seal provided thereon need to have some degree of radial load. Therefore, a large load is imparted on the drive shaft, leading to an excess loss. In addition, a typical drive device has structure in which the operation mechanism is positioned above the speed reducer. Therefore, for example, it may be difficult to maintain a sufficient spatial volume in the speed reducer, while lubricating the meshing portions in the speed reducer.

To address this problem, the rotary device 12 is positioned above the speed reducer 11. Therefore, the oil seal provided on the drive shaft 57 of the rotary device 12 can be removed. This reduces the load imparted on the drive shaft 57 and makes it possible to reduce the excess loss (that is, to accomplish a higher efficiency and a reduced back drive torque). Also, it can be prevented by the gravity that the lubricant of the speed reducer 11 flows on the drive shaft 57 of the rotary device 12 and enters the rotary device 12.

Further, the housing case 232 is positioned lateral to the speed reducer 11. Therefore, the surface of the lubricant in the speed reducer 11 can be lower than the position of the rotary device 12. Also, the drive device 230 as a whole can have sufficient space. This makes it possible to even the surface of the lubricant in the drive device 230, so as to maintain a sufficient spatial volume while lubricating the meshing components. In addition, since the housing case 232 is positioned lateral to the speed reducer 11, the drive device 230 can be made compact.

Eighth Embodiment

Figure 15:
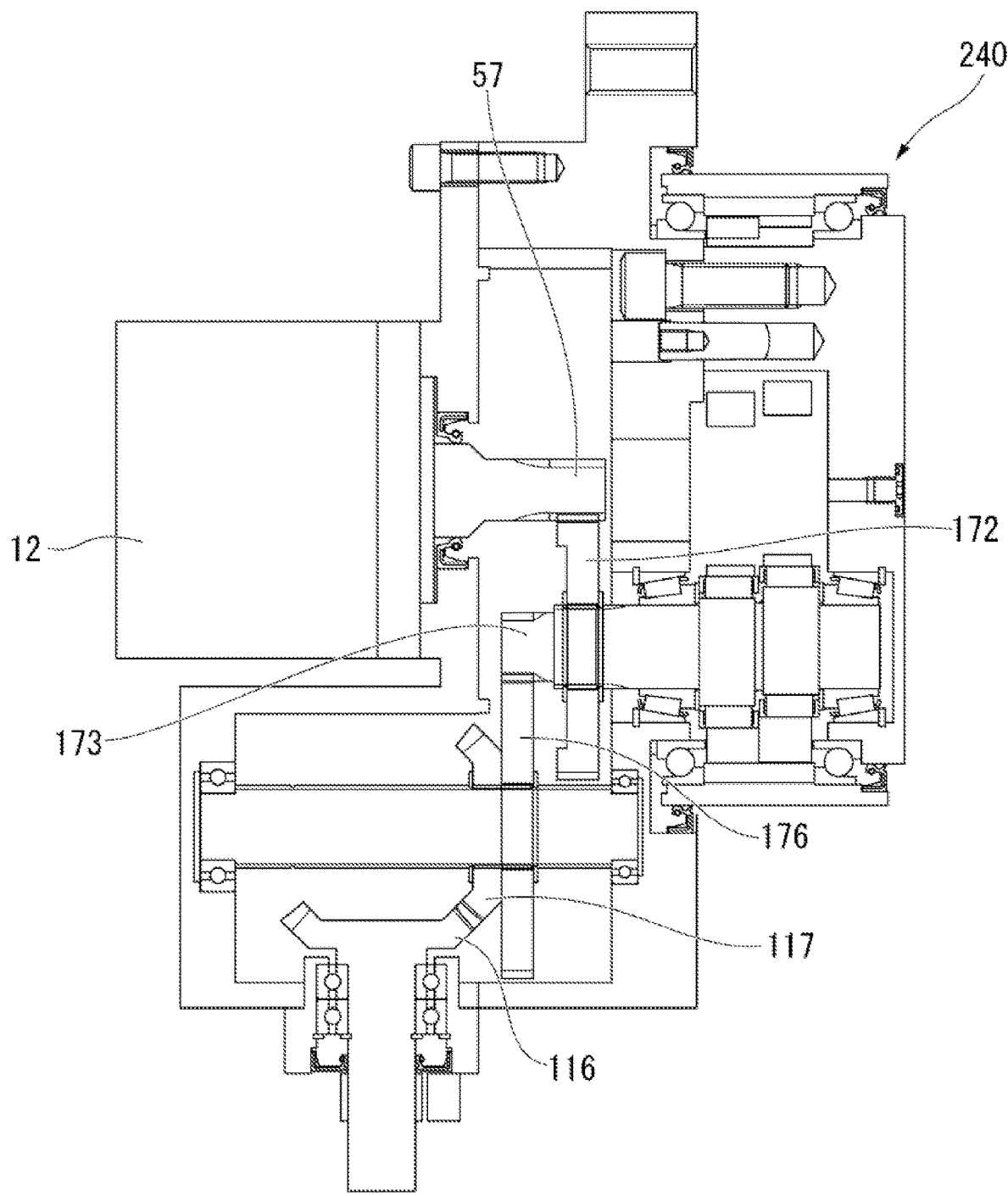
FIG. 15 is a sectional view showing a drive device according to an eighth embodiment of the present invention.

FIG. 15 is a sectional view showing a drive device according to an eighth embodiment. As shown in FIG. 15, the drive device 240 according to the eighth embodiment is obtained by redesigning the drive device 170 according to the sixth embodiment. Specifically, the reduction ratio of the crankshaft 171 to the rotary device 12 is within the range of 4 to 5, and the increasing ratio of the crankshaft 171 to the operation mechanism 175 is within the range of 4 to 5. The remaining features of the drive device 240 according to the eighth embodiment are the same as those of the drive device according to the sixth embodiment.

The drive device 240 is configured such that the reduction ratio accomplished by the drive shaft 57 of the rotary device 12 and the first transmission gear 172 is within the range of 4 to 5. The drive device 240 is also configured such that the increasing ratio accomplished by the first bevel gear 116, the second bevel gear 117, the intermediate gear 176, and the second transmission gear 173 is within the range of 4 to 5.

In a steering device of a vehicle for example, when a drive device with a speed reducer is driven by a rotary device (motor), a high reduction ratio is required to minimize the power consumption of the rotary device. Further, when the driver rotates the steering wheel, the steering by the driver needs to be output immediately, and thus operation with a low reduction ratio is required.

It is preferable that both the rotational output of the rotary device and the rotational output of the driver are input to a same speed reducer, and steering is accomplished by the rotational outputs input to the speed reducer. In order to configure the drive device such that both rotational outputs are input to the same speed reducer, and the drive device is capable of both the high reduction ratio and the low reduction ratio, it is necessary to set the transmission ratio from the rotary device to the speed reducer for deceleration and set the transmission ratio from the steering wheel to the speed reducer for acceleration.

Therefore, the reduction ratio of the crankshaft 171 to the rotary device 12 is within the range of 4 to 5, and the increasing ratio of the crankshaft 171 to the operation mechanism 175 is within the range of 4 to 5. With this configuration, an appropriate reduction ratio can be applied to the input from the rotary device 12 to the crankshaft 171, and the power consumption can be reduced. Also, an appropriate increasing ratio can be applied to the input from the operation mechanism 175 to the crankshaft 171, thereby facilitating quick performance of the driver operation. In addition, only with the setting of the reduction ratio of the crankshaft 171 to the rotary device 12 within the range of 4 to 5 and the setting of the increasing ratio of the crankshaft 171 to the operation mechanism 175 within the range of 4 to 5, the operation by the rotary device 12 and the operation by the driver can be performed properly, and the drive device 240 can be made compact.

Ninth Embodiment

Figure 16:
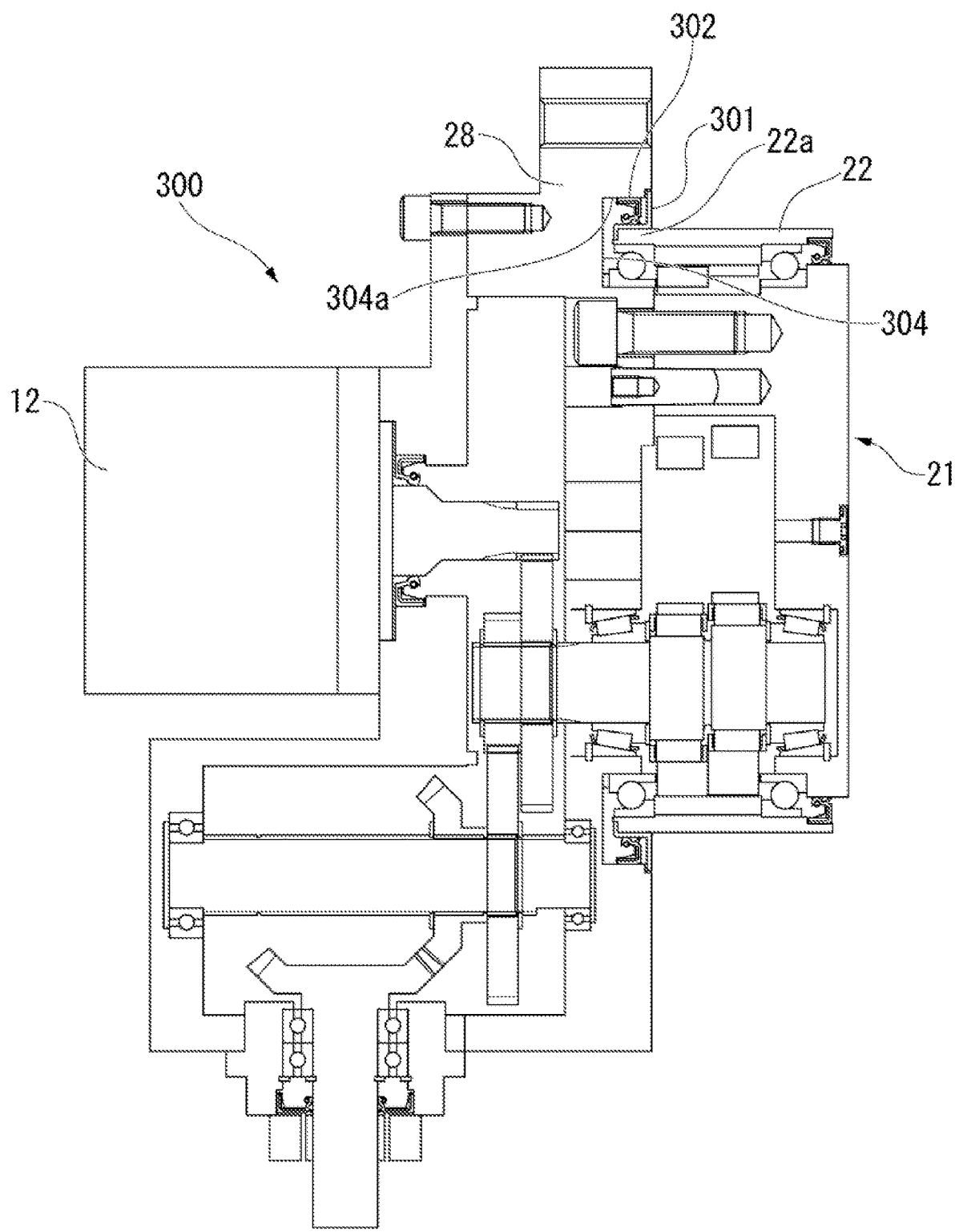
FIG. 16 is a sectional view showing a drive device according to a ninth embodiment of the present invention.
Figure 17:
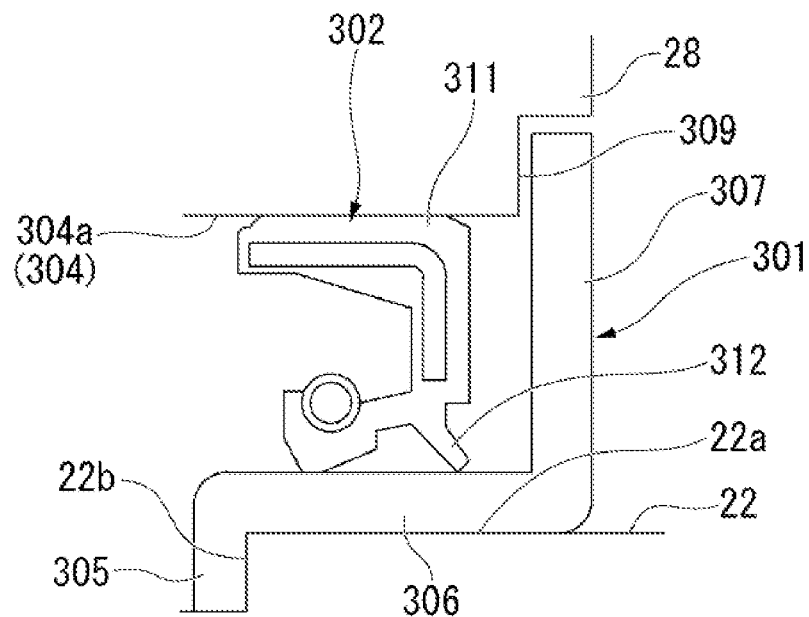
FIG. 17 is a sectional view showing, in an enlarged scale, a sleeve and an oil seal according to a ninth embodiment of the present invention.

FIG. 16 is a sectional view showing a drive device according to a ninth embodiment. FIG. 17 is a sectional view showing, in an enlarged scale, a sleeve and an oil seal according to the ninth embodiment. As shown in FIGS. 16 and 17, the drive device 300 according to the ninth embodiment is obtained by providing the drive device 210 of Modification 3 of the sixth embodiment with a sleeve 301 and an oil seal (seal) 302. The remaining features of the drive device 300 according to the ninth embodiment are the same as those of the drive device 210 according to Modification 3.

As shown in FIGS. 16 and 17, in the end plate portion 28 of the first case 21, an annular groove 304 is formed in the surface facing the second case 22. One end portion 22*a* of the second case 22 is inserted into the groove 304 of the end plate portion 28. An annular sleeve 301 is provided between an outer peripheral wall 304*a* of the groove 304 and the one end portion 22*a* of the second case 22. The sleeve 301 has, for example, a crank-shaped cross-section formed of an inner end portion 305, a first wall portion 306, and a second wall portion 307.

The inner end portion 305 is contacted with one end surface 22*b* of the second case 22. Therefore, the sleeve 301 is, for example, positioned by the one end surface 22*b* of the second case 22. The first wall portion 306 is contacted with the one end portion 22*a* (specifically, an outer peripheral surface of the one end portion 22*a*) of the second case 22. The sleeve 301 is, for example, fixed to (provided on) the one end portion 22*a* of the second case 22.

The second wall portion 307 is projected annularly from the first wall portion 306 to a step 309 of the end plate portion 28, so as not to contact with the step 309. Since the second wall portion 307 is disposed at the step 309 of the end plate portion 28, the gap between the second wall portion 307 and the step 309 can be formed in a labyrinthine configuration. Therefore, relative rotational movement is permitted between the sleeve 301 and the first case 21, and water and light are prevented properly from entering through the gap between the second wall portion 307 and the step 309. In this way, the space between the outer peripheral wall 304*a* of the groove 304 and the one end portion 22*a* of the second case 22 is blocked properly by the second wall portion 307 of the sleeve 301.

In the groove 304, the oil seal 302 having an annular shape is provided inside the second wall portion 307. The oil seal 302 includes a seal body 311 and a lip 312. The seal body 311 is contacted with the outer peripheral surface 304*a* of the groove 304 and the first wall portion 306, and the lip 312 is contacted with the first wall portion 306. In this way, the oil seal 302 seals tightly the space between the outer peripheral wall 304*a* of the groove 304 and the first wall portion 306. Also, the oil seal 302 is covered by the sleeve 301 on the outer side of the groove 304. The sleeve 301 is, for example, shaped like a crank, so as to prevent the oil seal 302 from being struck by rainwater, cleaning water, sunlight and the like. The following is the reason why the sleeve 301 is formed in this manner.

When the speed reducer is used in a specific environment such as outdoors and particularly vehicles, the speed reducer is used more frequently in environments having external factors such as rain, high pressure cleaning, ultraviolet rays, and hitting stones that previously had no impact. Therefore, currently no speed reducers can be used outdoors securely. Although sleeves are generally used for cleaning robots for example, these sleeves are not shaped for preventing impacts of external factors such as rain, high pressure cleaning, ultraviolet rays, and hitting stones.

To address this problem, the sleeve 301 is shaped like a crank for example, and fixed securely to the second case 22, such that the sleeve 301 can properly block the space (gap) between the outer peripheral wall 304*a* of the groove 304 and the one end portion 22*a* of the second case 22. Therefore, the oil seal 302 can be covered satisfactorily (securely) by the sleeve 301. Thus, with the use of the sleeve 301, the oil seal 302 can be protected from the impacts of the external factors such as rain, high pressure cleaning, ultraviolet rays, and hitting stones. In addition, the sleeve 301 is provided on the second case 22. This arrangement does not need a dedicated component for mounting the sleeve 301 and makes the speed reducer compact.

Modification 1

Figure 18:
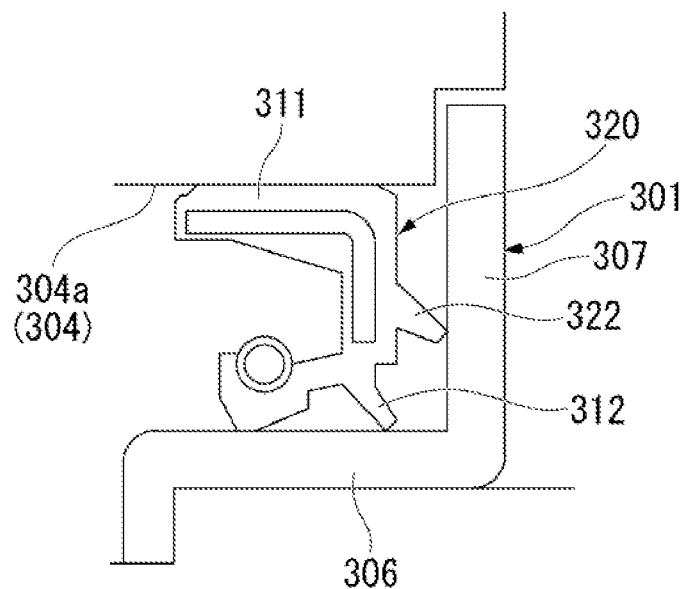
FIG. 18 is a sectional view showing an oil seal according to Modification 1 of the ninth embodiment of the present invention.

FIG. 18 is a sectional view showing Modification 1 of the oil seal according to the ninth embodiment. As shown in FIG. 18, the oil seal (seal) 320 of Modification 1 is obtained by adding a lip 322 (hereinafter referred to as "the second lip 322") to the oil seal 302 according to the ninth embodiment. The remaining features of the oil seal 320 according to the Modification 1 are the same as those of the oil seal 302 according to the ninth embodiment. The oil seal 320 includes the first lip 312 and the second lip 322. The first lip 312 contacts with the first wall portion 306. The second lip 322 contacts with the second wall portion 307. In this way, the oil seal 320 seals tightly the space between the outer peripheral wall 304*a* of the groove 304 and the first wall portion 306 and also seals tightly the space between the outer peripheral wall 304*a* of the groove 304 and the second wall portion 307. This increases the tightness of the oil seal 320.

Modification 2

Figure 19:
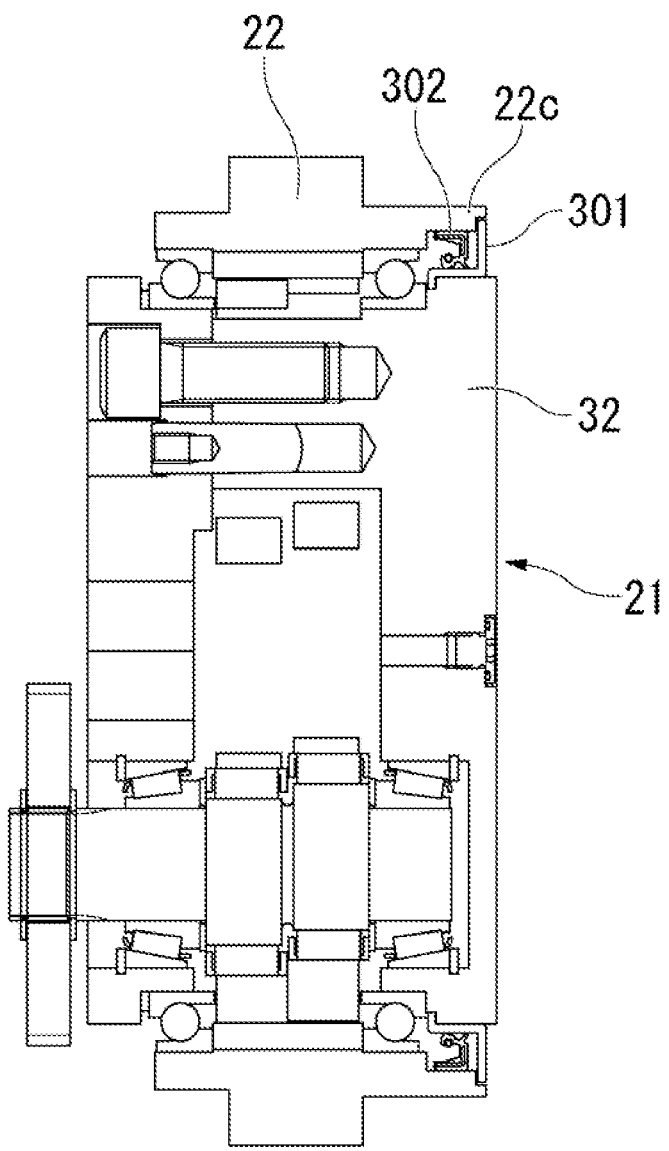
FIG. 19 is a sectional view showing Modification 2 of the ninth embodiment of the present invention in which the sleeve and the oil seal are mounted at different positions.

FIG. 19 is a sectional view showing Modification 2, which is an example in which the sleeve and the oil seal are mounted at different positions than in the ninth embodiment. As shown in FIG. 19, the sleeve 301 and the oil seal 302 are disposed between the base plate portion 32 of the first case 21 and the other end portion 22c of the second case 22. Since the sleeve 301 and the oil seal 302 are disposed between the base plate portion 32 of the first case 21 and the other end portion 22c of the second case 22, the sleeve 301 and the oil seal 302 seal tightly the space between the base plate portion 32 and the other end portion 22c of the second case 22. Further, with the use of the sleeve 301, the oil seal 302 disposed between the base plate portion 32 and the other end portion 22c of the second case 22 can be protected from the impacts of the external factors such as rain, high pressure cleaning, ultraviolet rays, and hitting stones.

Tenth Embodiment

Figure 20:
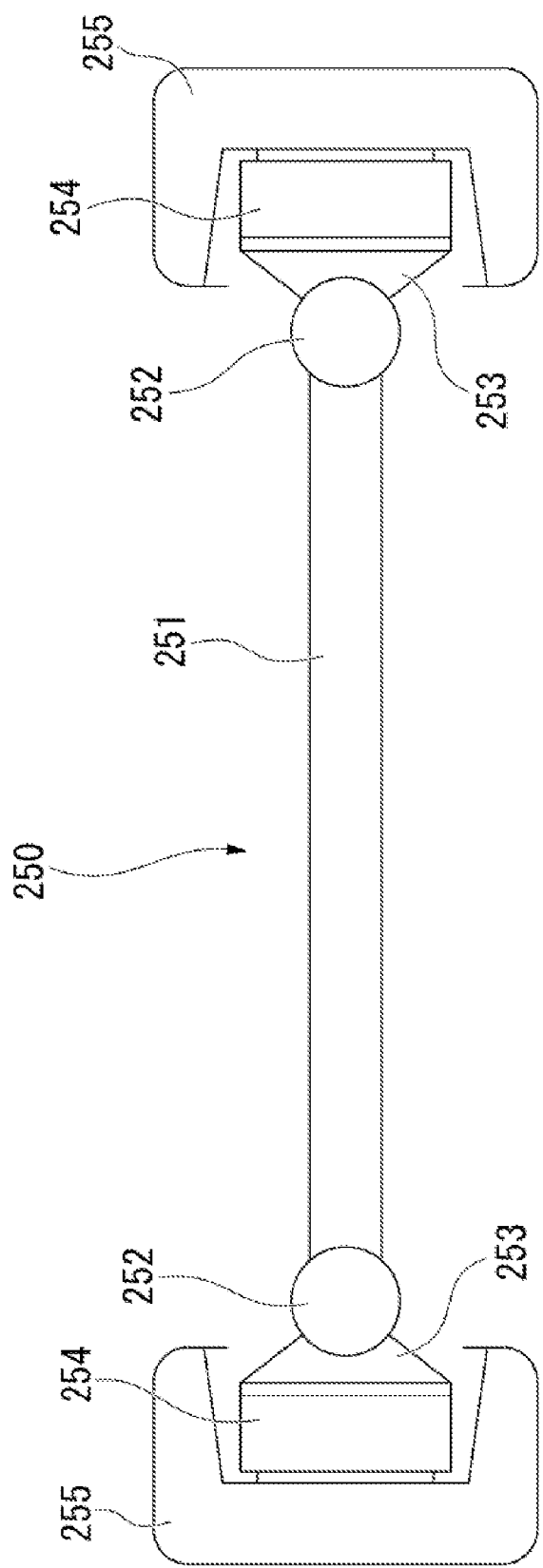
FIG. 20 is a plan view showing a steering device according to a tenth embodiment of the present invention.
Figure 21:
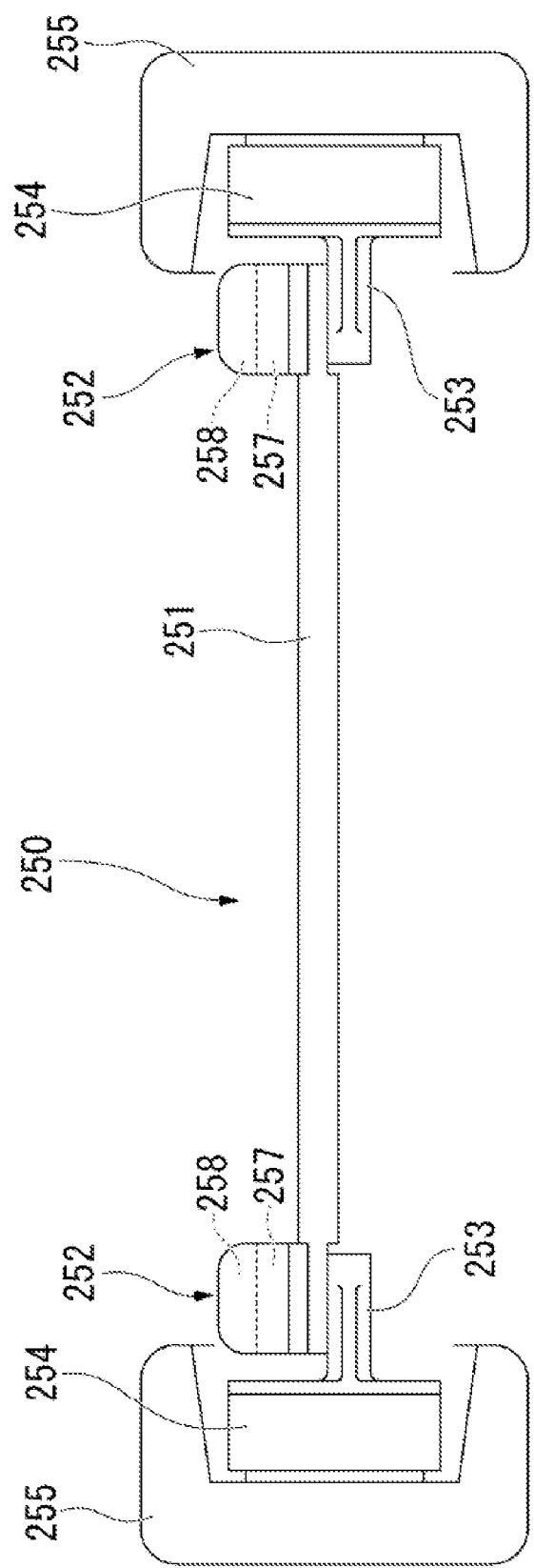
FIG. 21 is a front view showing the steering device according to the tenth embodiment of the present invention.
Figure 22:
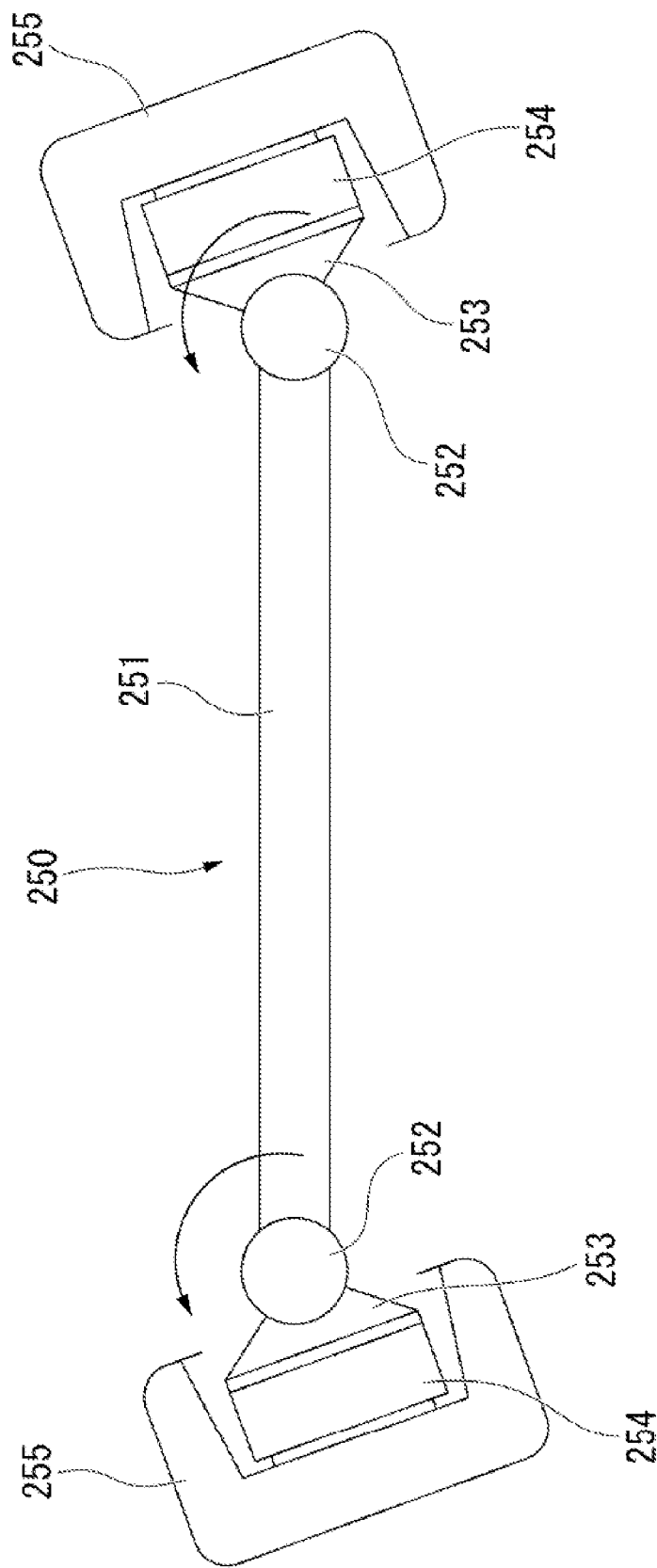
FIG. 22 is a plan view for explaining an example of operation of the steering device according to the tenth embodiment of the present invention.

FIG. 20 is a plan view showing a steering device with drive devices according to a tenth embodiment. FIG. 21 is a front view showing the steering device with the drive devices according to the tenth embodiment. FIG. 22 is a plan view for explaining an example of operation of the steering device using the drive devices according to the tenth embodiment.

As shown in FIGS. 20 and 21, the steering device 250 includes an axle shaft 251, drive devices 252, connecting portions 253, wheel driving portions (in-wheel motors) 254, and wheel portions 255. The axle shaft 251 extends in the width direction of a vehicle (not shown). The drive devices 252 are provided on opposite ends of the axle shaft 251.

Each of the drive devices 252 includes, for example, a speed reducer 257 and a rotary device (motor) 258. The speed reducer 257 and the rotary device 258 are, for example, any of the speed reducers and the rotary devices according to the first to ninth embodiments. The case of the speed reducer 257, for example, is mounted to the end of the axle shaft 251, and the output portion of the speed reducer 257, for example, is mounted to the connecting portion 253. The drive shaft of the rotary device 258 is connected to the input shaft of the speed reducer 257 such that a rotational force can be transmitted through these shafts. The wheel driving portion 254 is mounted to the connecting portion 253. The output portion of the wheel driving portion 254 is mounted to the wheel portion 255.

The drive device 252 is provided for each wheel (wheel portion 255). The speed reducer 257 also connects the wheel driving portion 254 provided on the wheel portion 255 to the end of the axle shaft 251 via the output portion thereof. Further, the rotary device 258 inputs a rotational force to the input shaft of the speed reducer 257, thereby oscillating the wheel driving portion 254 horizontally to the axle shaft 251. The wheel driving portion 254 is, for example, an in-wheel motor for rotating the wheel portion 255, and the wheel driving portion 254 also serves as a regeneration brake.

In the automotive industry for example, the shift to electric vehicles (EVs) is underway in consideration of their environmental impact. The challenge is to electrify driving and steering with a view to automated driving.

To address this challenge, as shown in FIG. 22, the wheel driving portion 254 is oscillated by the drive device 252 (the speed reducer 257 and the rotary device 258) horizontally to the axle shaft 251. This configuration allows the shift to EVs and automated driving of vehicles. Also, steering links can be omitted, allowing steer-by-wire configuration without the need for mechanical linkage. Since steering links are omitted, the drive device 252 can be made compact. Further, since the drive device 252 is provided for each wheel, it is possible, for example, to differentiate the number of rotations between inner and outer wheels, allowing steering with small losses.

Eleventh Embodiment

Figure 23:
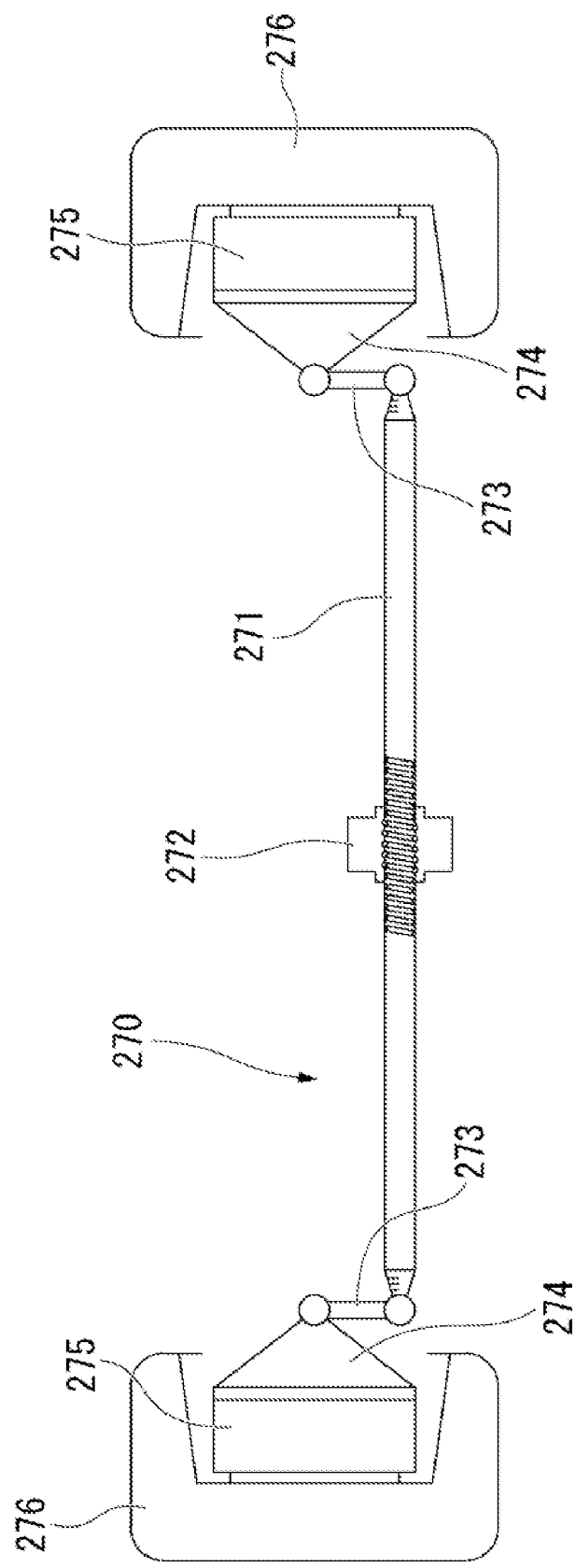
FIG. 23 is a plan view showing a steering device according to an eleventh embodiment of the present invention.
Figure 24:
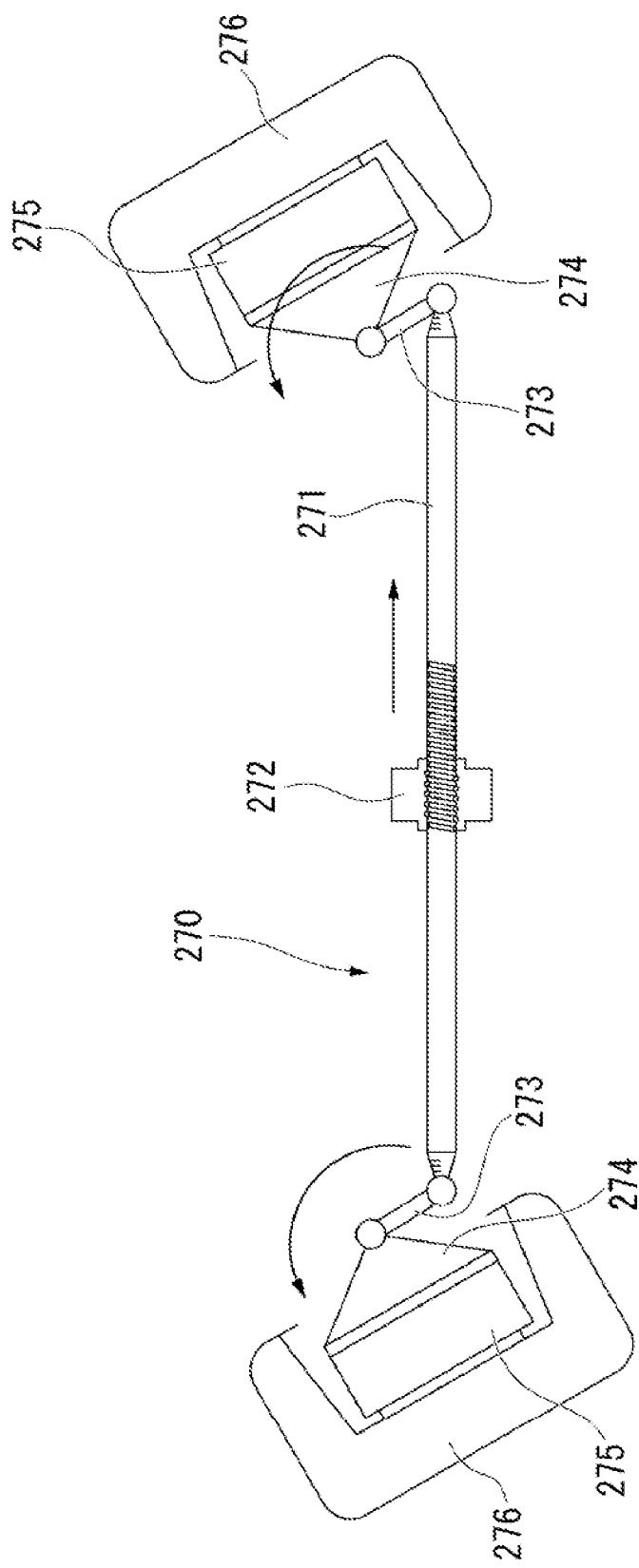
FIG. 24 is a plan view for explaining an example of operation of the steering device according to the eleventh embodiment of the present invention.

FIG. 23 is a plan view showing a steering device with a drive device according to an eleventh embodiment. FIG. 24 is a plan view for explaining an example of operation of the steering device using the drive device according to the eleventh embodiment.

As shown in FIG. 23, the steering device 270 includes a tie rod 271, a drive device 272, links 273, connecting portions 274, wheel driving portions (in-wheel motors) 275, and wheel portions 276. The tie rod 271 extends in the width direction of a vehicle (not shown). The drive device 272 is provided at the middle of the tie rod 271. The drive device 272 is, for example, a hollow motor (direct drive unit) and is configured to move the tie rod 271 in the vehicle width direction by means of a ball screw or a rack and pinion. The connecting portions 274 are connected to the opposite ends of the tie rod 271 via the links 273. The wheel driving portions 275 are mounted to the connecting portions 274.

In other words, the drive device 272 is connected to the wheel driving portions 275 via the links 273. The output portions of the wheel driving portions 275 are mounted to the wheel portions 276. The drive device 272 moves the tie rod 271 in the vehicle width direction by means of a ball screw or a rack and pinion, thereby oscillating the wheel driving portions 275 horizontally to the tie rod 271. The drive device 272 may be either formed of a rotary device (motor) alone or formed of a speed reducer with a rotary device. When the drive device 272 is formed of a speed reducer with a rotary device, for example, any of the speed reducers and the rotary devices according to the first to ninth embodiments are applicable. The wheel driving portions 275 are, for example, in-wheel motors for rotating the wheel portions 276, and the wheel driving portions 275 also serve as regeneration brakes.

In the automotive industry for example, the shift to electric vehicles (EVs) is underway in consideration of their environmental impact. The challenge is to electrify driving and steering with a view to automated driving.

To address this challenge, as shown in FIG. 24, the wheel driving portions 275 are oscillated by the drive device 272 horizontally to the tie rod 271. This configuration allows the shift to EVs and automated driving of vehicles. Also, steering links can be omitted, allowing steer-by-wire configuration without the need for mechanical linkage. Since steering links are omitted, the drive device 272 can be made compact.

The technical scope of the present invention is not limited to the embodiments described above but is susceptible of various modification within the purport of the present invention.

The elements of the embodiments described above may be replaced with known elements within the purport of the present invention. Further, the modifications described above may be combined.

What is claimed is:
1. A speed reducer comprising:
    at least one gear member configured to change a speed of rotations input from a rotary device and to output the rotations;
    a case configured to house the at least one gear member; and a heating unit provided on the case and configured to heat the case or an inside of the case, wherein the case includes:
- a cylindrical first case in which one end thereof is closed by an end plate portion; and
- a cylindrical second case disposed to be concentric with the first case and configured to cover an outer circumferential surface of the first case, wherein the end plate portion is formed with a through hole concentric with a main axis, and wherein the heating unit is provided on an outer circumferential surface of the second case or an inner peripheral surface of the through hole.

2. The speed reducer of claim 1, wherein the case has internal teeth, and wherein the at least one gear member includes:
- a crankshaft supported so as to be rotatable around a rotation axis that corresponds to an axial direction of the case; and
- a plurality of external tooth members, each having external teeth meshing with the internal teeth, the plurality of external tooth members being eccentrically movable by the crankshaft.

3. The speed reducer of claim 1, wherein the case has internal teeth, wherein the speed reducer includes:
- a crankshaft disposed radially inside the case and supported so as to be rotatable around a rotation axis that corresponds to an axial direction of the case; and
- a plurality of external tooth members, each having external teeth meshing with the internal teeth, the plurality of external tooth members being eccentrically movable by the crankshaft, wherein the case has 80 to 120 internal teeth, and
wherein an amount of eccentricity of the crankshaft is 1.3 mm or smaller.

4. A speed reducer comprising:
at least one gear member configured to change a speed of rotations input from a rotary device and to output the rotations;
a case configured to house the at least one gear member; and
a sleeve provided on the case and configured to protect a seal tightly sealing the case,
wherein the case includes:
- a cylindrical first case having an end plate portion projecting radially outward; and
- a cylindrical second case disposed to be concentric with the first case and covering an outer circumferential surface of the first case,
wherein an annular groove is formed in a surface of the end plate portion facing the second case,
wherein one end portion of the second case is inserted into the groove,
wherein the sleeve includes:
- an annular first wall portion fixed to an outer circumferential surface of the one end portion of the second case; and
- an annular second wall portion projecting radially outward from the first wall portion,
wherein the second wall portion is disposed at a step so as not to contact the step, the step is formed in an inner surface of the groove facing the first wall portion, and
wherein the seal is disposed between the inner surface of the groove and the first wall portion and between a bottom of the groove and the second wall portion.

5. The speed reducer of claim 4, wherein the case has internal teeth, and wherein the at least one gear member includes:
- a crankshaft supported so as to be rotatable around a rotation axis that corresponds to an axial direction of the case; and
- a plurality of external tooth members, each having external teeth meshing with the internal teeth, the plurality of external tooth members being eccentrically movable by the crankshaft.

6. The speed reducer of claim 4, wherein the case has internal teeth, wherein the speed reducer includes:
- a crankshaft disposed radially inside the case and supported so as to be rotatable around a rotation axis that corresponds to an axial direction of the case; and
- a plurality of external tooth members, each having external teeth meshing with the internal teeth, the plurality of external tooth members being eccentrically movable by the crankshaft, wherein the case has 80 to 120 internal teeth, and
wherein an amount of eccentricity of the crankshaft is 1.3 mm or smaller.

7. The drive device of claim 4, wherein the seal includes:
a first lip configured to contact the first wall portion, and
a second lip configured to contact the second wall portion.

8. A drive device comprising:
a rotary device having a housing; and
a speed reducer including:
at least one gear member configured to change a speed of rotations input from the rotary device and to output the rotations; and
a case housing the at least one gear member,
wherein the rotary device is mounted to the case,
wherein a wall of the case to which the rotary device is mounted serves as a wall of the housing of the rotary device,
wherein the case has internal teeth,
wherein the drive device includes:
- a crankshaft disposed radially inside the case and supported so as to be rotatable around a rotation axis that corresponds to an axial direction of the case;
- a plurality of external tooth members, each having external teeth meshing with the internal teeth, the plurality of external tooth members being eccentrically movable by the crankshaft; and
- an operation mechanism configured to input an external rotational force to the crankshaft,
wherein the operation mechanism includes:
- a driven bevel gear configured to transmit the rotational force to the crankshaft; and
- a driving bevel gear positioned orthogonal to an axis of the driven bevel gear and meshed with the driven bevel gear, and
wherein the driven bevel gear is configured to be switchable between a first meshing position and a second meshing position for rotating different directions.

9. A drive device of claim 7, comprising:
a rotary device having a housing; and
a speed reducer including:
at least one gear member configured to change a speed of rotations input from the rotary device and to output the rotations; and
a case housing the at least one gear member, wherein the rotary device is mounted to the case,
wherein a wall of the case to which the rotary device is mounted serves as a wall of the housing of the rotary device,
wherein the case has internal teeth,
wherein the drive device includes:
  a crankshaft disposed radially inside the case and supported so as to be rotatable around a rotation axis that corresponds to an axial direction of the case;
  a plurality of external tooth members, each having external teeth meshing with the internal teeth, the plurality of external tooth members being eccentrically movable by the crankshaft; and
  an operation mechanism configured to input an external rotational force to the crankshaft,
wherein the rotary device configured to input a rotational force to the crankshaft, and
wherein the crankshaft has:
  a first transmission gear configured to receive input from the rotary device; and
  a second transmission gear configured to receive input from the operation mechanism, the second transmission gear being disposed adjacent to the first transmission gear.

10. A drive device comprising:
a rotary device having a housing; and
a speed reducer including:
  at least one gear member configured to change a speed of rotations input from the rotary device and to output the rotations; and
  a case configured to house the at least one gear member,
wherein the rotary device is mounted to the case,
wherein a wall of the case to which the rotary device is mounted serves as a wall of the housing of the rotary device,
wherein the case has internal teeth,
wherein the drive device includes:
  a crankshaft disposed radially inside the case and supported so as to be rotatable around a rotation axis that corresponds to an axial direction of the case;
  a plurality of external tooth members, each having external teeth meshing with the internal teeth of the case, the plurality of external tooth members being eccentrically movable by the crankshaft; and
  an operation mechanism configured to input an external rotational force to the crankshaft,
wherein the rotary device configured to input a rotational force to the crankshaft,
wherein a reduction ratio of the crankshaft to the rotary device is within a range of 4 to 5, and
wherein an increasing ratio of the crankshaft to the operation mechanism is within a range of 4 to 5.

11. A drive device comprising:
a rotary device having a housing; and
a speed reducer including:
  at least one gear member configured to change a speed of rotations input from the rotary device and to output the rotations; and
  a case configured to house the at least one gear member,
wherein the rotary device is mounted to the case,
wherein a wall of the case to which the rotary device is mounted serves as a wall of the housing of the rotary device,
wherein the speed reducer configured to connect a wheel driving portion provided on a wheel portion to an axle shaft, and
wherein the rotary device configured to input a rotational force to the speed reducer, so as to oscillate the wheel driving portion horizontally to the axle shaft.

* * * * *